United States Patent
Singh et al.

(10) Patent No.: US 9,423,822 B1
(45) Date of Patent: Aug. 23, 2016

(54) AUTOMATIC DATA ACQUISITION SUBSYSTEM SYNCHRONIZATION AND SAMPLE RATE ARBITRATION

(71) Applicant: The MathWorks, Inc., Natick, MA (US)

(72) Inventors: Manisha Singh, Framingham, MA (US); Robert Purser, Wayland, MA (US); Wael Hemdan, Stoneham, MA (US)

(73) Assignee: The MathWorks, Inc., Natick, MA (US)

( * ) Notice: Subject to any disclaimer, the term of this patent is extended or adjusted under 35 U.S.C. 154(b) by 211 days.

(21) Appl. No.: 14/209,667

(22) Filed: Mar. 13, 2014

Related U.S. Application Data

(60) Provisional application No. 61/785,579, filed on Mar. 14, 2013.

(51) Int. Cl.
*G06F 1/00* (2006.01)
*G06F 1/08* (2006.01)

(52) U.S. Cl.
CPC ........................................ *G06F 1/08* (2013.01)

(58) Field of Classification Search
CPC ....................................... G06F 1/08; G06F 9/00
USPC ....................................................... 713/1, 501
See application file for complete search history.

(56) References Cited

U.S. PATENT DOCUMENTS

| | | | | |
|---|---|---|---|---|
| 6,738,920 B1* | 5/2004 | Horne | ................ | G05B 19/0423 710/9 |
| 6,760,838 B2* | 7/2004 | Owen | ................... | G06F 15/177 709/250 |
| 7,512,500 B2* | 3/2009 | Wilt | ................... | G05B 23/0208 702/182 |
| 2010/0138171 A1* | 6/2010 | George | ................ | B63H 9/0642 702/50 |
| 2011/0138083 A1* | 6/2011 | Balgard | ............ | H04L 12/40013 710/8 |
| 2012/0228946 A1* | 9/2012 | Sim | ........................ | H01M 2/024 307/80 |
| 2013/0108898 A1* | 5/2013 | Potts | ..................... | H02J 7/0013 429/50 |
| 2014/0091770 A1* | 4/2014 | Lee | .......................... | H04Q 9/00 320/135 |
| 2014/0365792 A1* | 12/2014 | Yun | ...................... | G06F 1/3212 713/320 |

\* cited by examiner

*Primary Examiner* — Vincent Tran
(74) *Attorney, Agent, or Firm* — Wilmer Cutler Pickering Hale and Dorr LLP

(57) ABSTRACT

Embodiments of the disclosed subject matter can provide techniques for synchronizing data acquisition (DAQ) modules in a data acquisition system. In data acquisition systems where multiple DAQ modules are in use, it can be desirable to synchronize the DAQ modules to facilitate the analysis of signals captured by sensors coupled to those DAQ modules. This way, a signal processing platform, such as a computer, can analyze different sensor signals (e.g., an audio sensor and vibration sensor) without separately compensating for the time difference between the audio and vibration signals. In some embodiments, the synchronization techniques can include an automatic or a semi-automatic mechanism for temporally synchronizing the sensors and for arbitrating the sampling rate between the data acquisition systems.

21 Claims, 17 Drawing Sheets

DAQ₁ AI Configuration Information

| Property | Value |
|---|---|
| Scan Clock | Onboard |
| Start Trigger | Onboard |
| Exported Scan Clock | DAQ1/PFI0 |
| Exported Start Trigger | DAQ1/PFI1 |

FIG. 6A

DAQ₁ AO Configuration Information

| Property | Value |
|---|---|
| Scan Clock | DAQ1/PFI0 |
| Start Trigger | DAQ1/PFI1 |
| Exported Scan Clock | -- |
| Exported Start Trigger | -- |

FIG. 6B

DAQ₂ AI Configuration Information

| Property | Value |
|---|---|
| Scan Clock | DAQ2/PFI0 |
| Start Trigger | DAQ2/PFI1 |
| Exported Scan Clock | - |
| Exported Start Trigger | - |

FIG. 6C

DAQ₂ AO Configuration Information

| Property | Value |
|---|---|
| Scan Clock | DAQ2/PFI0 |
| Start Trigger | DAQ2/PFI1 |
| Exported Scan Clock | - |
| Exported Start Trigger | - |

FIG. 6D

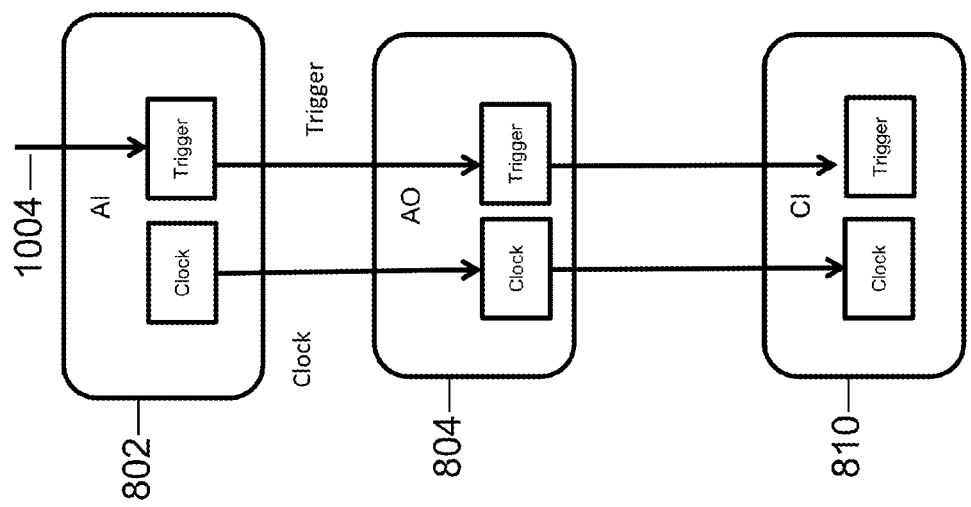

AUTOMATIC DATA ACQUISITION SUBSYSTEM SYNCHRONIZATION AND SAMPLE RATE ARBITRATION

CROSS-REFERENCE TO RELATED APPLICATIONS

This application claims priority to U.S. Provisional Application No. 61/785,579, filed on Mar. 14, 2013, entitled "AUTOMATIC DATA ACQUISITION SUBSYSTEM SYNCHRONIZATION AND SAMPLE RATE ARBITRATION," which is incorporated by reference herein in its entirety.

FIELD OF THE DISCLOSED SUBJECT MATTER

At least some embodiments of the present disclosure generally relate to data processing apparatus, systems, and methods for providing synchronization and sample rate arbitration in data acquisition systems.

BACKGROUND

Modern data acquisition ("DAQ") systems typically include one or more DAQ modules. A DAQ module can include and/or can be coupled to a sensor system that is configured to acquire target data and to provide the acquired target data to the DAQ module. The target data can include any information types. For example, the target data can include a signal, for instance, an analog signal, a digital signal, and/or a discrete continuous-time signal. As another example, the target data can include a target data stream, for instance, images, videos, files, streaming data, measurement data, and/or character data. The DAQ module can be configured to receive the target data over any medium capable of carrying information. For example, the DAQ module can be configured to receive the target data over a wire, an optical fiber, and/or a radio-frequency (RF) medium.

For example, a prototype car on a test track can include several sensor systems for capturing audio data, video data, and vibration signals that can be used to characterize the performance of the prototype car in various testing conditions. Each sensor system can be coupled to one or more DAQ module. Each DAQ module can be configured to receive target data from the coupled sensor system, and provide the received target data (or a modified form thereof) to a signal processing platform, such as a computer. However, in systems with multiple DAQ modules, problems can arise when the various DAQ modules are not synchronized with one another. Additionally, some DAQ modules may have different sampling rates (e.g., 50 Hz versus 75 Hz) that are inconsistent with one another, which can result in additional error.

SUMMARY

Various aspects of the disclosed subject matter may provide one or more of the following capabilities. Signals from multiple DAQ modules can be automatically or semi-automatically synchronized with minimal operator involvement. A control module can automatically or semi-automatically determine a common sampling rate that can be used by two or more DAQ modules. Subcomponents of DAQ modules can be initialized in a manner that reduces the amount of corrupted data produced by the DAQ module. Sub-components in multiple DAQ modules can be initialized to improve synchronization between the DAQ modules. Subcomponents in multiple DAQ modules can be initialized in a manner that reduces the amount of corrupted data produced by the DAQ modules.

The control module can also analyze the configuration of one or more DAQ modules, and recommend users to make modifications to one or more DAQ modules to improve the synchronization of the one or more DAQ modules. These and other capabilities of the disclosed subject matter will be more fully understood after a review of the following figures, detailed description, and claims.

In general, in an aspect, embodiments of the disclosed subject matter can include an apparatus. The apparatus can include at least one processor configured to execute code to cause the at least one processor to select a first subsystem from a plurality of subsystems in a data acquisition (DAQ) module as a master subsystem, cause a clock signal and a trigger signal from the master subsystem to be provided to at least one additional subsystem in the plurality of subsystems in an order represented by a first linear chain, and initialize the master subsystem and the at least one additional subsystem in an order represented by a second linear chain, the initializing occurring after the clock signal and the trigger signal are provided to the at least one additional subsystem, and the second linear chain being a reverse of the first linear chain.

In general, in an aspect, embodiments of the disclosed subject matter can include a computerized method. The method can include selecting, by a control module in communication with a data acquisition (DAQ) module, a subsystem of the DAQ module as a master subsystem based on an ability of the subsystem to provide a subsystem clock signal and a subsystem trigger signal to other subsystems in the DAQ module, causing, by the control module, a clock signal and a trigger signal from the master subsystem to be provided to at least one additional subsystem in the DAQ module in an order represented by a first linear chain, and after the clock signal and the trigger signal are provided to the at least one additional subsystem, initializing the master subsystem and the at least one additional subsystem in an order represented by a second linear chain that is in a reverse configuration of the first linear chain used to provide the clock signal and the trigger signal to the at least one additional subsystem in the DAQ module.

In general, in an aspect, embodiments of the disclosed subject matter can include a non-transitory computer readable medium having executable instructions. The executable instructions can be configured to, when executed by at least one processor, cause at least one processor to communicate with a data acquisition (DAQ) module, select a subsystem in the DAQ module as a master subsystem, cause a clock signal and a trigger signal from the master subsystem to be provided to at least one additional subsystem in the DAQ module in an order represented by a first linear chain in accordance with a synchronization mechanism determined based on a type of the DAQ module, and after the clock signal and the trigger signal are provided to all of the at least one additional subsystem, initialize the master subsystem and the at least one additional subsystem in an order represented by a second linear chain that is in a reverse configuration of the first linear chain used to provide the clock signal and the trigger signal to the at least one additional subsystem in the DAQ module.

In any one of the embodiments disclosed herein, the at least one subsystem can include an analog input subsystem.

In any one of the embodiments disclosed herein, the clock signal of the master subsystem can include a clock signal received from an external source.

In any one of the embodiments disclosed herein, the method, the apparatus, or the non-transitory computer readable medium can include steps, modules, or executable instructions for causing a selection of the subsystem as the master subsystem based on an ability of the subsystem to provide a subsystem clock signal and a subsystem trigger signal to other subsystems in the DAQ module.

In any one of the embodiments disclosed herein, the method, the apparatus, or the non-transitory computer readable medium can include steps, modules, or executable instructions for causing the clock signal and the trigger signal from the master subsystem to be provided to at least one additional subsystem of the plurality of subsystems based on a synchronization mechanism, the synchronization mechanism determined based on a type of the DAQ module.

In any one of the embodiments disclosed herein, the method, the apparatus, or the non-transitory computer readable medium can include steps, modules, or executable instructions for receiving configuration information for the master subsystem, wherein the configuration information is indicative of a connection from which the master subsystem can receive the clock signal, and configuring the master subsystem to receive the clock signal from the connection indicated by the configuration information.

In any one of the embodiments disclosed herein, the method, the apparatus, or the non-transitory computer readable medium can include steps, modules, or executable instructions for initiating all subsystems of the same type before initiating a subsystem of a different type.

In any one of the embodiments disclosed herein, the method, the apparatus, or the non-transitory computer readable medium can include steps, modules, or executable instructions for receiving a plurality of signals from a plurality of DAQ modules, identifying a marker data point from each of the plurality of signals, wherein the marker data point corresponds to a predetermined event that is sensed by each of the plurality of DAQ modules, and aligning the marker data point in each of the plurality of signals to temporally align the plurality of signals from the plurality of DAQ modules.

In any one of the embodiments disclosed herein, the method, the apparatus, or the non-transitory computer readable medium can include steps, modules, or executable instructions for discarding a data point from a signal received from the DAQ module based on a synchronization technique used to synchronize subsystems of the DAQ module.

In any one of the embodiments disclosed herein, the method, the apparatus, or the non-transitory computer readable medium can include steps, modules, or executable instructions for discarding an output data point of an analog output subsystem when the output data point is provided prior to initiating an analog input subsystem.

In any one of the embodiments disclosed herein, the method, the apparatus, or the non-transitory computer readable medium can include steps, modules, or executable instructions for receiving information on desired connections of a plurality of DAQ modules, determining that actual connections of the plurality of DAQ modules do not match the desired connections, and providing a warning signal indicating that the actual connections of the plurality of DAQ modules do not match the desired connections.

BRIEF DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting.

FIGS. 6A-6D illustrate configuration information of subsystems in DAQ modules in accordance with some embodiments.

FIG. 10B illustrates a process of synchronizing subsystems of a DAQ module using an external trigger signal in accordance with some embodiments.

DETAILED DESCRIPTION

Figure 1:
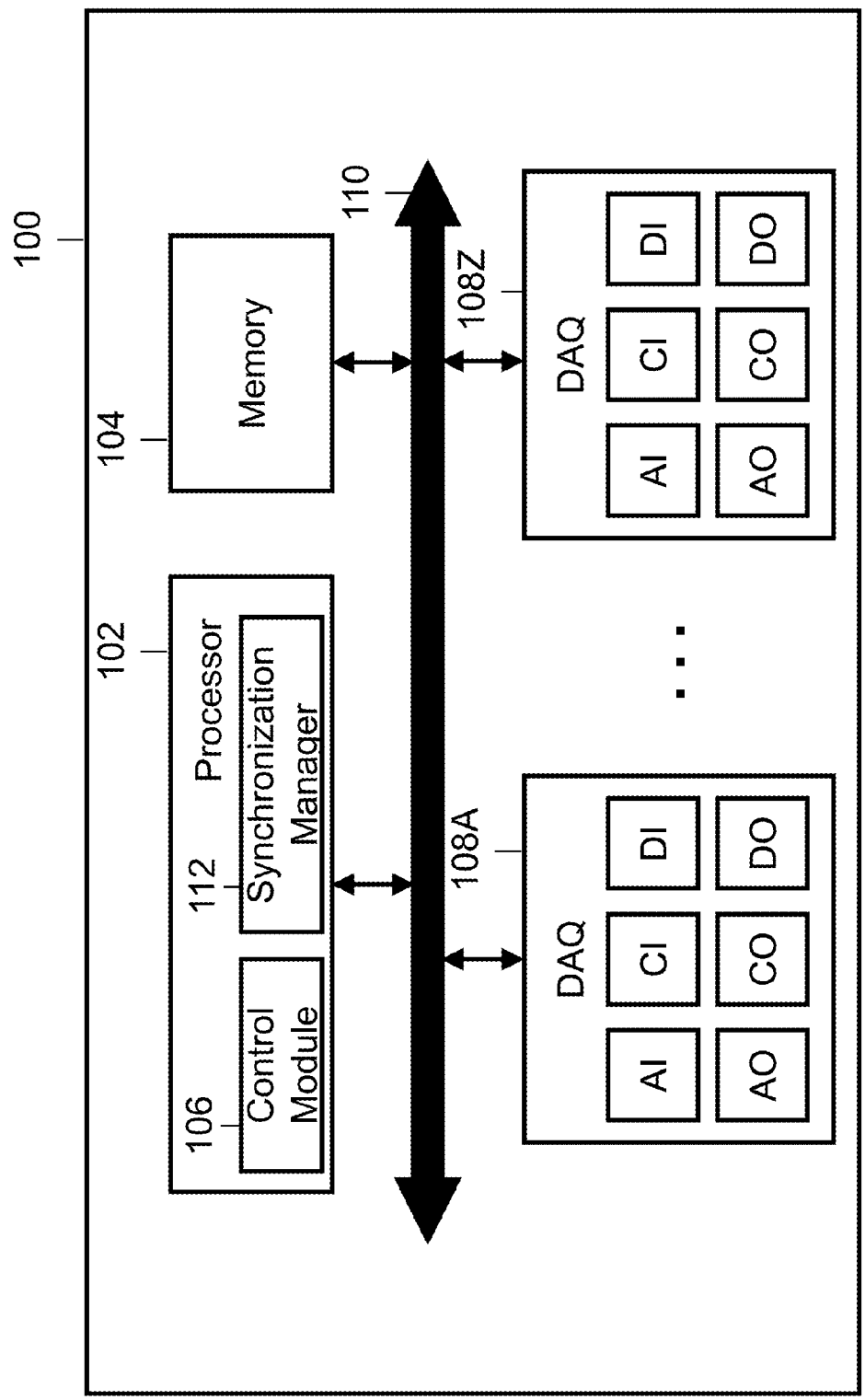
FIG. 1 illustrates a data acquisition (DAQ) system having a plurality of DAQ modules in accordance with some embodiments.

Embodiments of the disclosed subject matter can provide techniques for synchronizing data acquisition (DAQ) modules in a data acquisition system. In data acquisition systems where multiple DAQ modules are in use, it can be desirable to synchronize the DAQ modules to facilitate the analysis of signals captured by sensors coupled to those DAQ modules. This way, a signal processing platform, such as a computer, can analyze different sensor signals (e.g., data from an audio sensor, an image sensor, and/or a vibration sensor) without separately compensating for the time difference between the audio and vibration signals. In some embodiments, the synchronization techniques can include an automatic or a semi-automatic mechanism for temporally synchronizing the sensors and for arbitrating the sampling rate between the data acquisition systems. Other embodiments are within the scope of the disclosed subject matter.

A DAQ system can include a plurality of data acquisition modules, each configured to receive target data from another device, such as a sensor system. For example, a first data acquisition module in a cellular phone can receive, from a gyro-sensor, a signal indicative of a physical pose of the cellular phone; a second data acquisition module in the cellular phone can receive, from a brightness sensor, a light level of the environment surrounding the cellular phone; and a third data acquisition module in the cellular phone can receive, from a capacitive touch sensor, a location at which a user has made a physical contact with a screen of the cellular phone. These data acquisition modules can operate in parallel to sense information about the physical world, such as surroundings and/or predetermined events. The input and/or output of the data acquisition modules can be analog and/or digital. In some cases, signals received by data acquisition modules can be represented in a discrete-time domain and/or in a discrete-amplitude domain. Therefore, signals received by data acquisition modules can sometimes be referred to as data streams.

Oftentimes, signals received by data acquisition modules are processed by a signal processing platform. As described above, it can be desirable to temporally synchronize the data acquisition modules so that the signal processing platform can process the signals without calibrating the temporal differences. Unfortunately, the temporal synchronization often involves manual operations, which can be time consuming.

Embodiments of the subject matter disclosed herein can use a DAQ module synchronization mechanism that can automatically or semi-automatically synchronize DAQ modules. In some embodiments, the synchronization mechanism can automatically designate one of the DAQ modules as a master DAQ module and the remaining DAQ modules as slave DAQ modules based on the capabilities of the DAQ modules. In other embodiments, the synchronization mechanism can designate one of the DAQ modules as a master DAQ module and the remaining DAQ modules as slave DAQ modules based, at least in part, on, for example, a user input or a specification received from another computing device. Once the master DAQ module and the slave DAQ modules are designated, the master DAQ module is configured to provide its clock signal to the slave DAQ modules so that the slave DAQ modules can synchronize their internal clock signals to the master DAQ module's clock signal. Furthermore, this clock signal can be used to ensure that the DAQ modules can stay synchronized together.

In some embodiments, DAQ modules can be synchronized using a trigger signal, which provides a temporal reference at which all DAQ modules can initiate their operations. For example, when the DAQ modules receive an identical or similar trigger signal substantially simultaneously, they can use the trigger signal as a temporal reference and initiate their operations substantially simultaneously. In some sense, all DAQ modules are operating as a slave DAQ module with respect to a trigger signal source. As another example, the master DAQ module can be configured to provide a trigger signal to the slave DAQ modules so that the slave DAQ modules can initiate their operations based on the master DAQ module's command.

In some embodiments, a single DAQ module can include a plurality of subsystems, and each subsystem can be operated using its own internal clock and/or its own trigger source. In such embodiments, it can be desirable to synchronize the plurality of subsystems within the single DAQ module in order to provide a global synchronization across the DAQ modules. The DAQ module synchronization mechanism can automatically or semi-automatically synchronize the plurality of subsystems in a single DAQ module. The synchronization mechanism can involve designating one of the plurality of subsystems as a master subsystem (also referred to sometimes as a source subsystem) and the remaining subsystems as slave subsystems (also referred to sometimes as destination subsystems). In some embodiments, the master subsystem is configured to provide its clock signal to the slave subsystems so that the slave subsystems can synchronize their internal clock signals to the master subsystem's clock signal. Furthermore, this clock signal can be used to ensure that the subsystems remain synchronized with respect to each together.

In some embodiments, the master subsystem and the slave subsystems can be synchronized using a trigger signal, which can provide a temporal reference at which the master subsystem and the slave subsystems can initiate their operations. For example, the master subsystem can be configured to provide a trigger signal to the slave subsystems so that the slave subsystems can initiate their operations based on the master subsystem's command. An example of a trigger signal is the pressing of a shutter-release button on a camera, which triggers the operation of other sensors within the camera. Trigger signals can be generated internally by a subsystem and/or can be provided by an external source.

In some embodiments, when a user wants to use only a subset of subsystems in a DAQ module, only the subset of subsystems can be synchronized using, for example, a clock signal and/or a trigger signal. In some embodiments, when a user wants to use only a subset of DAQ modules in a DAQ system, only the subset of DAQ modules can be synchronized using, for example, a clock signal and/or a trigger signal.

In some embodiments, the master DAQ module and/or the master subsystem can receive the clock signal and/or the trigger signal from an external source. The external source can include an external controller, a control module coupled to the DAQ module, or another DAQ module.

In some embodiments, each of the plurality of DAQ modules and/or subsystems can support a different set of sampling rates. For example, a first DAQ module might support sampling rates of 10 MHz, 20 MHz, and 50 MHz, whereas a second DAQ module might support sampling rates of 20 MHz, 50 MHz, and 60 MHz. In order to match the timing of signals received from the first DAQ module and the second DAQ module, it is desirable to match the sampling rate of the first DAQ module and the second DAQ module. Therefore, the disclosed data processing apparatus, systems, and methods can provide a sampling rate arbitration mechanism for setting a sampling rate of DAQ modules and/or subsystems in DAQ modules to be consistent with one another (e.g., both at 50 MHz). In some instances, sampling rates in multiple DAQ modules can be selected so that they are an integer multiple one another (e.g., 10 MHz and 20 MHz) to reduce the processing necessary to synchronize the two DAQ modules.

FIG. 1 illustrates a DAQ system having a plurality of DAQ modules in accordance with some embodiments. A system 100 includes a processor 102, a memory device 104, a plurality of DAQ modules 108A-108Z, and an interface 110. The processor 102 can also include a control module 106. While the system 100 is shown as including specific functional components, other configurations of the system 100 are possible. For example, the functionality provided by the processor 102 can be split across multiple physical processors, the control module 106 can be provided by a device other than the processor 102, and/or other interface configurations between the processor 102, memory 104, and the DAQ modules 108 are possible (e.g., using direct connections to the processor 102 rather than a bus-style architecture). Additionally, the components of the system 100 can be local and/or remote from one another (e.g., the memory 104 can be cloud-based and geographically remote from the processor 102).

The memory 104 can be a non-transitory computer readable medium, flash memory, a magnetic disk drive, an optical drive, a programmable read-only memory (PROM), a read-only memory (ROM), or any other memory or combination of memories. Software can be executed by the processor 102 such that the processor 102 carries out the functionality described in this specification. The processor 102 might also be implemented in hardware using an application specific integrated circuit (ASIC), programmable logic array (PLA), field programmable gate array (FPGA), or any other integrated circuit. The processor 102 can also be a CPU or microcontroller such as a Intel-based processor or a Motorola microcontroller. Although the processor 102 is illustrated as a single entity, the processor 102 can include a plurality of processors that can together provide the desired functionality of the processor 102. In some embodiments, the plurality of processors can be implemented as a system in package (SiP) in which some of the plurality of processors are implemented on separate dies. In other embodiments, some of the plurality of processors can be implemented in the same die.

A DAQ module 108 can be configured to receive signals, such as one or more data streams, from an apparatus, for example, a sensor system. Exemplary DAQ systems are those produced by National Instruments (e.g., X-series DAQs). To enable the communication between the DAQ module 108 and the sensor system, the DAQ module 108 can include one or more subsystems, also referred to as components of the DAQ module 108, configured to interface with the one or more sensor systems. For example, the DAQ module 108 can include one or more of an analog input (AI) subsystem, an analog output (AO) subsystem, a counter input (CI) subsystem, a counter output (CO) subsystem, a digital input (DI) subsystem, and/or a digital output (DO) subsystem that can interface with sensor systems.

In some embodiments, the DAQ module 108 can include and/or be implemented as a software DAQ module, which is configured to simulate an operation of a hardware DAQ module. For example, the software DAQ module can feed data to the control module 106, or the system 100 in general, as if the software DAQ module is receiving target data from an apparatus, for example, a sensor system. That is, it is possible to create a simulation of a system including a DAQ where the data being received by the DAQ and the DAQ operation itself is simulated.

In some embodiments, the DAQ module 108 can include a hardware in the loop (HIL) DAQ module that is configured to emulate operations of a hardware DAQ module. The HIL DAQ module can receive emulation parameters from a control device, such as the control module 106, so that the HIL DAQ module can emulate a variety of types of DAQ modules 108.

In some embodiments, the control module 106 can include or be part of a computer-based data acquisition software package (e.g., MATLAB Data Acquisition Toolbox, made by The MathWorks, Inc. of Natick, Mass.). The control module 106 can be implemented using software stored in the non-transitory memory device 104, such as a non-transitory computer readable medium. The software stored in the memory device 104 can run on the processor 102 capable of executing computer instructions or computer code. In some embodiments, the control module 106 can be implemented in hardware that is separate from the processor 102. For example, the control module 106 can be implemented using an ASIC. As another example, the control module 106 can be implemented in hardware using a logic circuit, a PLA, a DSP, a FPGA, or any other integrated circuit. In some cases, the control module 106 can be packaged in the same package as other integrated circuits, such as the processor 102.

In some embodiments, the control module 106 can be configured to control the operation of DAQ modules 108 in the system 100. For example, the control module 106 can be configured to: determine that the DAQ modules 108 are properly connected to sensor systems, synchronize the operation of the DAQ module 108, synchronize the operation of subsystems within a single DAQ module 108 and/or arbitrate the sampling rate used by the DAQ modules 108.

In some embodiments, the control module 106 can provide synchronization of the DAQ modules 108. The control module 106 can handle a variety of DAQ module configurations. For example, the control module 106 can provide synchronization of (1) two or more USB/PCI devices, (2) two or more CompactDAQ chassis/modules, (3) two or more PCI eXtensions for Instrumentation (PXI) devices, and/or (4) two or more DSA (Dynamic Signal Analyzer) devices.

In some embodiments, the control module 106 can adapt the synchronization mechanism based on the DAQ system configuration. In particular, the control module 106 can be configured to determine which synchronization mechanism can work well for the particular DAQ system configuration. The control module 106 can be configured to determine the synchronization mechanism based, at least in part, on the DAQ module types, the interface (e.g., bus) type, the sensor system type, and/or any other information that may be relevant to determining the synchronization mechanism. For example, in a DAQ system having a PXI architecture, the control module 106 can be configured to recognize that the DAQ system has the PXI architecture and determine, based on the information about the PXI architecture, that the DAQ modules in the DAQ system should be synchronized using the PXI reference clock (e.g., the PXI 10 MHz Reference Clock) and the PXI clock signal (e.g., the Start Trigger lines).

In some embodiments, the control module 106 can be configured to group DAQ modules and/or subsystems that are used in a particular application of interest. For example, the control module 106 can be configured to group DAQ modules and/or subsystems that operate together at the same rate and for the same duration. The grouped DAQ modules and/or subsystems can be referred to as a session (e.g., a group of channels that run together at the same rate and for the same duration). Subsequently, the control module 106 can be configured to synchronize only the DAQ modules and/or subsystems in the same session. This way, the control module 106 can reduce the time delay and the power consumption incurred by the synchronization of unused DAQ modules and/or subsystems.

An interface 110 can serve as an input and/or output mechanism for modules and subsystems, within and/or outside of the system 100, to communicate with one another. The interface 110 can be implemented in hardware to send and receive signals in a variety of mediums, such as optical, copper, and/or wireless, and in a number of different protocols some of which may be non-transient. The interface 110 can include one or more wires, a bus, or any other non-transient media for communicating signals. The interface 110 can be, for example, USB 802.11, Bluetooth, PCI, PCIx, PXI, VME, VMEx, FireWire, Serial ATA, Parallel ATA, VESA Local Bus, $I^2C$, SMBus, Serial Peripheral Interface Bus, or any other types of communication medium suited for the system 100.

A synchronization manager 112 can include a module that is configured to receive configuration information from a user and to provide the received configuration information to the control module 106. The synchronization manager 112 can be implemented using software stored in the non-transitory memory device 104, such as a non-transitory computer readable medium. In some embodiments, the synchronization manager 112 can be implemented in hardware that is separate from the processor 102. For example, the control module 106 can be implemented using an ASIC. As another example, the synchronization manager 112 can be implemented in hardware using a logic circuit, a PLA, a DSP, a FPGA, or any other integrated circuit. In some cases, the synchronization manager 112 can be packaged in the same package as other integrated circuits, such as the processor 102.

In some embodiments, the system 100 can include a simulation module that is capable of simulating (e.g., computationally estimating) operations of the system 100. The simulation module can include one or more software DAQ modules 108 that are configured to simulate an operation of a hardware DAQ module, and a software control module 108 that is configured to synchronize the operation of the one or more software DAQ modules 108 in the simulation module. This way, the simulation module can simulate operations of at least a portion of the system 100.

In some embodiments, the system 100 can include user equipment. The user equipment can communicate with one or more radio access networks and with wired communication networks. The user equipment can be a cell phone, a smart phone, a tablet computer, and any device that is configured to provide services such as word processing, web browsing, gaming, e-book capabilities, an operating system, and a full keyboard. The user equipment can also keep global positioning coordinates, profile information, or other location information.

The system 100 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The system 100 can be configured with one or more processors 102 that process instructions and run software that can be stored in memory 104. The processor 102 can also communicate with the memory 104 and interfaces 110 to communicate with other devices. The processor 102 can be any applicable processor such as a system-on-a-chip that combines a CPU, an application processor, and flash memory. The system 100 can also provide a variety of user interfaces such as a keyboard, a touch screen, a trackball, a touch pad, and/or a mouse. The system 100 may also include speakers and a display device in some embodiments. The system 100 can also include a bio-medical electronic device.

Figure 2:
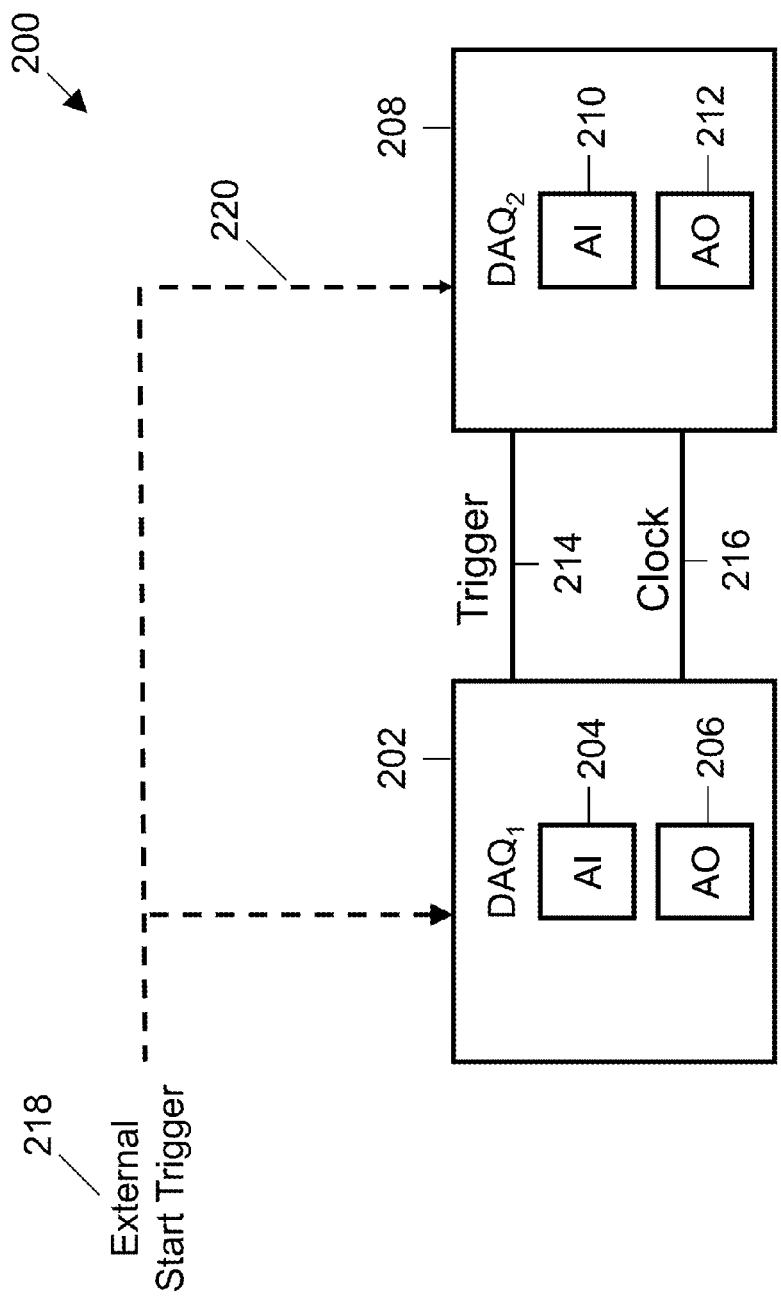
FIG. 2 shows a DAQ system 200 with two DAQ modules (e.g., 202 and 208), which is an exemplary embodiment of the system in FIG. 1.

FIG. 2 shows a DAQ system 200 with two DAQ modules (e.g., 202 and 208), which is an exemplary embodiment of the system 100. The first DAQ module 202 includes an AI subsystem 204 and an AO subsystem 206, and the second DAQ module 208 includes an AI subsystem 210 and an AO subsystem 212. Referring back to the cellular phone example, the first DAQ module 202 can represent a DAQ module coupled to a gyro-sensor in the cellular phone, and the second DAQ module 208 can represent a DAQ module coupled to a brightness sensor. The first DAQ module 202 and the second DAQ module 208 can be coupled to one another using, for example, a trigger signal 214 and a clock signal 216. The trigger signal 214 and a clock signal 216 can be transmitted over a communication medium, for example, the interface 110.

In some embodiments, one of the DAQ modules 202, 208 can be selected as a master DAQ module and the remaining DAQ module can be selected as a slave DAQ module.

Figure 3:
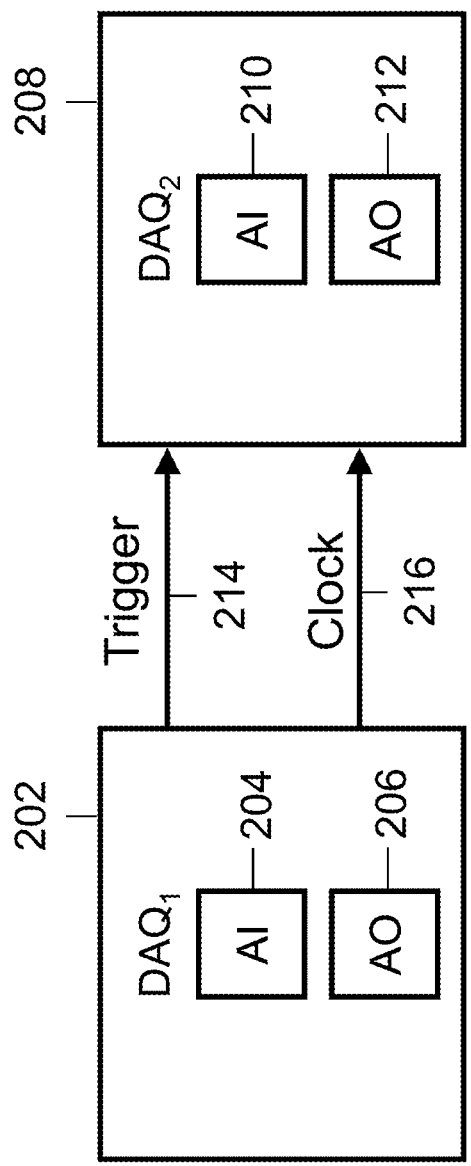
FIG. 3 illustrates, in accordance with some embodiments, one of the DAQ modules 202, 208 can be selected as a master DAQ module and the remaining DAQ module can be selected as a slave DAQ module.

FIG. 3 illustrates, in accordance with some embodiments, one of the DAQ modules 202, 208 can be selected as a master DAQ module and the remaining DAQ module can be selected as a slave DAQ module. FIG. 3 illustrates an exemplary configuration of the DAQ system 200 in which the first DAQ module 202 is identified as a master DAQ module and the second DAQ module 204 is identified as a slave DAQ module. The master DAQ module 202 can be configured to provide its trigger signal 214 and/or its clock signal 216 to the slave DAQ module 208 so that the master DAQ module 202 and the slave DAQ module 208 can be synchronized.

Figure 4:
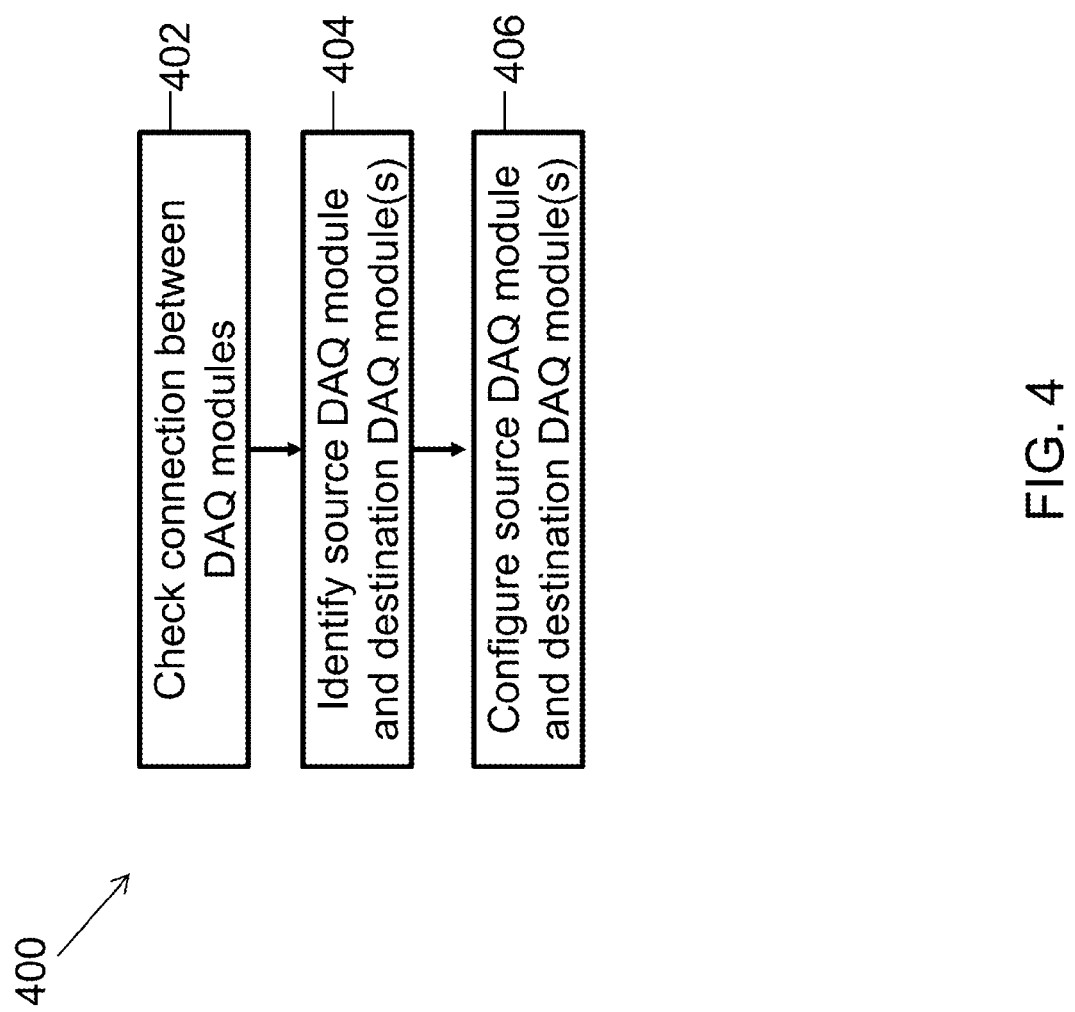
FIG. 4 illustrates an exemplary DAQ module initialization process in accordance with some embodiments.

Referring to FIG. 4, an exemplary DAQ module initialization process 400 is shown. In some embodiments this process can be used to initialize the DAQ modules 202, 208 prior to performing the synchronization process. The process 400 is exemplary and may be altered, e.g., by having stages added, removed, or rearranged.

In step 402, the control module 106 can check the connection of DAQ modules 202, 208 within the DAQ system. To this end, the control module 106 can receive connection information: the information on connections in the DAQ system and signals carried by the connections in the DAQ system. For example, the control module 106 can receive connection information, indicating that two or more DAQ modules 202, 208 are coupled via a PFI (Programmable Function Interface); or that two PCI (Peripheral Component Interconnect) devices are coupled via a Real-Time System Integration (RTSI) cable. Furthermore, the control module 106 can receive information that the PFI connections are configured to carry a trigger signal 214 or a scan clock signal 216. In some embodiments, the control module 106 can receive the connection information as a configuration file. In other embodiments, the control module 106 can receive the connection information from, for example, a user via a synchronization manager 112.

Once the control module 106 receives the connection information, the control module 106 can compare the connection information to actual configuration of the DAQ system 200 to determine whether the connection information matches the actual connections and signals within the DAQ system 200. If the connection information does not match the actual connections and signals within the DAQ system 200, then the control module 106 can provide a warning signal. The warning signal can indicate that the DAQ system 200 cannot be initialized properly as specified by the information. A potential source of such error is the failure to provide connections as specified by the connection information. Since the control module 106 can detect the source of this error, the control module 106 can inform the user and identify a procedure for fixing the connection problem. This process can be referred to as identifying and correcting an under-defined system.

For example, in FIG. 2, a user may want to synchronize AI subsystems 204, 210 of two DAQ modules 202, 208 using an external trigger signal 218. To this end, the user may provide the connection information that the user has made a connection between the external trigger source 218 and the DAQ modules 202, 208. However, the user may in fact forget to make the connection 220 between the trigger source 218 and the DAQ module 208. In this case, the control module 106 can detect this failure to provide the connection 220, and provide an error message. The error message can indicate that the user should provide the connection 220 between the external trigger source 218 and the DAQ module 208.

In step 404, once the connections within the DAQ system 200 have been verified, the control module 106 can identify master and slave DAQ modules (e.g., source and slave DAQ modules) amongst the DAQ modules 202, 208 in the DAQ system 200. The distinction between the master DAQ module and the slave DAQ module can be important because the synchronization priority can be given to the master DAQ module. For example, the master DAQ module can coordinate the synchronization process of all DAQ modules in the system 100.

The control module 106 can semi-automatically identify a master DAQ module or a slave DAQ module, amongst the DAQ modules 202, 208 in the DAQ system 200, based, at least in part, on a user input. For example, a user can specify, via a command input or via a configuration file, that a particular DAQ module, for example, the first DAQ module 202, is a master DAQ module. In this case, the rest of the DAQ modules, for example, the second DAQ module 208, can be automatically identified as slave DAQ modules.

In other embodiments, the control module 106 can automatically identify a master DAQ module and/or a slave DAQ module, amongst the DAQ modules 202, 208 in the DAQ system 200. For example, the control module 106 can select the master DAQ module based on a master DAQ module selection strategy. The master DAQ module selection strategy can depend on the DAQ system configurations. For example, in a DAQ system with CompactDAQ modules, the control module 106 can identify a DAQ module with an analog input subsystem as the master DAQ module and the remaining DAQ modules as slave DAQ modules. As another example, in a DAQ system with PXI modules, the control module 106 can identify, as the master DAQ module, a DAQ module that can act as a master device and the remaining DAQ modules as slave DAQ modules. For example, the control module 106 is configured to identify, as the master DAQ module, a DAQ module that is capable of exporting its clock signal and its trigger signal to other DAQ modules.

In step 406, the control module 106 can configure the DAQ modules 202, 208 in the DAQ system 200. The configuration of a DAQ module can be performed independently of other DAQ modules in the DAQ system 200. In some embodiments, the control module 106 can configure the source DAQ module prior to configuring the slave DAQ modules. In other embodiments, the control module 106 can configure the DAQ modules in any predetermined order. For example, the control module 106 can configure the DAQ modules in a random order.

The configuration of a DAQ module can involve configuring subsystems within the DAQ module. For example, when a DAQ module includes only one subsystem, the control module 106 can configure device properties of the subsystem, such as but not limited to, a start trigger configuration, a scan clock configuration, an exported start trigger configuration, and an exported scan clock configuration. The start trigger configuration can indicate a wire or a source from which the subsystem can receive a trigger signal; the scan clock configuration can indicate a wire or a source from which the subsystem can receive a clock signal; the exported start trigger configuration can indicate whether the subsystem should export its trigger signal for use by other subsystems; and the exported scan clock configuration can indicate whether the subsystem should export its clock signal for use by other subsystems.

Figure 5:
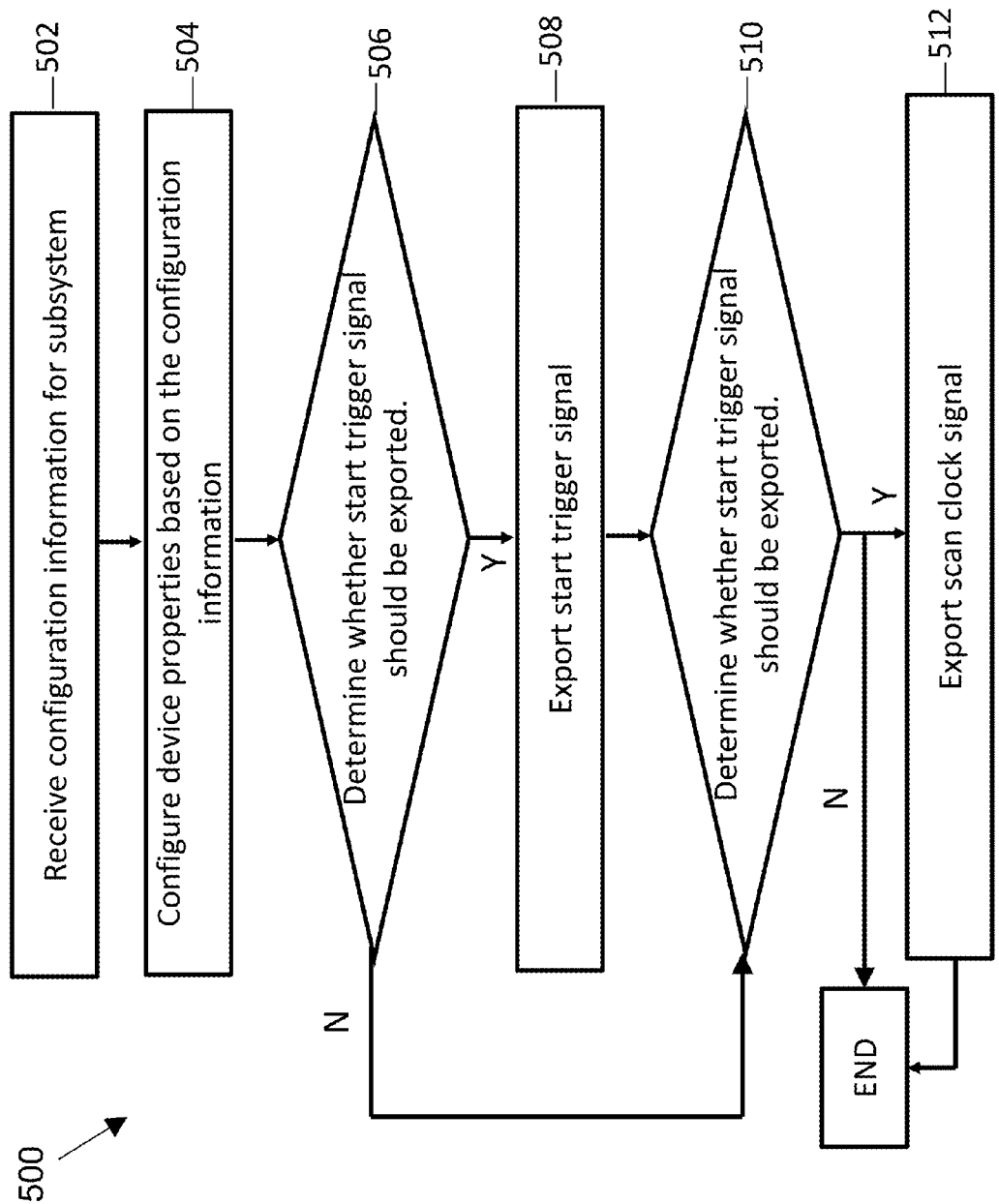
FIG. 5 illustrates a configuration process of a subsystem in a DAQ module in accordance with some embodiments.

FIG. 5 illustrates an exemplary configuration process 500 of a subsystem in a DAQ module in accordance with some embodiments. When a DAQ module includes more than one subsystem, the control module 106 can configure each subsystem independently. The process 500 is exemplary. The process 500 may be altered, e.g., by having stages added, removed, or rearranged.

In step 502, the control module 106 can receive configuration information for the subsystem. In some cases, the control module 106 can be configured to receive the configuration information from a synchronization manager 112. The configuration information can include information on the physical connections provided by the user, any DAQ module-specific characteristics, and/or an identification of a master DAQ module. In some embodiments, the synchronization manager can be a part of the control module 106.

Continuing to refer to the example illustrated in FIGS. 2-3, FIGS. 6A-6D illustrate exemplary configuration information of subsystems in DAQ modules 202, 208. In particular, FIGS. 6A-6B illustrate configuration information of subsystems in the first DAQ module 202; and FIGS. 6C-6D illustrate configuration information of subsystems in the second DAQ module 208. The configuration information can indicate the wires, the interface, and/or the sources of the scan clock signal and the start trigger signal from which the corresponding subsystem should receive the scan clock signal and the start trigger signal. The configuration information can also indicate whether the corresponding subsystem should export its scan clock signal and the start trigger signal, and if so, the wires or the interfaces to which these signals should be exported.

For example, the configuration information of the AI subsystem 204, provided in FIG. 6A, indicates that the AI subsystem 204 should receive the scan clock signal and the start trigger signal from onboard, and export its scan clock signal and the start trigger signal to PFI0 and PFI1 wires of the first DAQ module 202, respectively. On the other hand, the configuration information of the AO subsystem 206, provided in FIG. 6B, indicates that the AO subsystem 206 should receive the scan clock signal and the start trigger signal from PFI0 and PFI1 wires of the first DAQ module 202, respectively, and that the AO subsystem 206 should not export its scan clock signal and its start trigger signal.

The configuration information of the AI subsystem 210, provided in FIG. 6C, indicates that the AI subsystem 210 should receive the scan clock signal and the start trigger signal from PFI0 and PFI1 wires of the second DAQ module 208, respectively, and that the AI subsystem 210 should not export its scan clock signal and its start trigger signal. On the other hand, the configuration information of the AO subsystem 212, provided in FIG. 6D, indicates that the AO subsystem 212 should receive the scan clock signal and the start trigger signal from PFI0 and PFI1 wires of the second DAQ module 208, respectively, and that the AO subsystem 212 should not export its scan clock signal and its start trigger signal.

In step 504, the control module 106 can configure device properties of the subsystem based on the received configuration information. For example, the control module 106 can cause the subsystem to receive a clock signal and/or a trigger signal from one or more predetermined wires identified in the received configuration information.

In step 506, the control module 106 can determine whether the start trigger signal of the subsystem should be exported. In some cases, the control module 106 can determine that the start trigger signal of the subsystem should be exported to a predetermined wire, as identified in the configuration information, when the start trigger signal has not been exported by any of the subsystems in the DAQ module. In other cases, the control module 106 can determine that the start trigger signal of the subsystem should be exported when the subsystem being configured is a master subsystem. When the control module 106 determines that the start trigger signal of the subsystem should be exported, the process 500 proceeds to step 508, otherwise it continues to step 510.

In step 508, the control module 106 can export the start trigger signal of the subsystem to a predetermined wire, as identified in the configuration information. For example, the control module 106 can cause the subsystem to route its start trigger signal to a predetermined wire or a predetermined interface. Referring to the example in FIG. 6A, the control module 106 can cause the AI module 204 to export its start trigger signal to a wire identified by the identifier "DAQ1/PFI1."

In step 510, the control module 106 can determine whether the scan clock signal of the subsystem should be exported to a predetermined wire, as identified in the configuration information. In some cases, the control module 106 can determine that the scan clock signal of the subsystem should be exported when the scan clock signal has not been exported by any of the subsystems in the DAQ module. In other cases, the control module 106 can determine that the scan clock signal of the subsystem should be exported when the subsystem being configured is a master subsystem. When the control module 106 determines that the scan clock signal of the subsystem should be exported, the process 500 proceeds to step 512, otherwise its ends.

In step 512, the control module 106 can export the scan clock signal of the subsystem. For example, the control module 106 can cause the subsystem to route its scan clock signal to a predetermined wire or a predetermined interface. Referring to the example in FIG. 6A, the control module 106 can cause the AI module 204 to export its start scan clock signal to a wire identified by the identifier "DAQ1/PFI0." When the control module 106 determines that the scan clock signal of the subsystem does not need to be exported, the control module 106 can directly complete the configuration process.

In some embodiments, the control module 106 can iterate the process 500 to configure subsystems of a DAQ module in the following exemplary order: the analog input subsystem, the analog output subsystem, the counter input subsystem, the counter output subsystem, the digital input subsystem, and the digital output subsystem. This way, the input subsystems are initiated before the output subsystems so that the signals provided by the output subsystems are valid. As the control module 106 proceeds to configure the subsystems in the order provided above, if the DAQ module does not have a corresponding subsystem, or if a particular session does not use a corresponding subsystem, the control module 106 can skip the configuration of that subsystem and move on to the subsystem with the subsequent priority. In other embodiments, the control module 106 can configure the subsystems of the DAQ module in any order, for example, a random order.

Once the subsystems in DAQ modules are configured, the control module 106 can trigger the subsystems to start or initiate their operation. In some embodiments, the control module 106 can trigger the subsystems to start the operation in the reverse of the order in which the subsystems were configured. Thus, using the embodiments described above, the control module 106 can cause the subsystems to be initiated in the following order: the digital output subsystem, the digital input subsystem, the counter output subsystem, the counter input subsystem, the analog output subsystem, and the analog input subsystem. Because the counter input subsystem can use the clock signal from the analog input subsystem (e.g., the master subsystem), the counter input subsystem can be started before the analog input subsystem. In some embodiments, the digital input subsystem can be started before the analog input subsystem.

In some embodiments, the control module 106 can coordinate the initiation of subsystems across DAQ modules. In such embodiments, the control module 106 can cause all subsystems of the same type to be initiated before causing another type of subsystems to be initiated. For example, the control module 106 can cause all AO subsystems across multiple DAQ modules to be initiated before causing any AI subsystems to be initiated.

Figure 7:
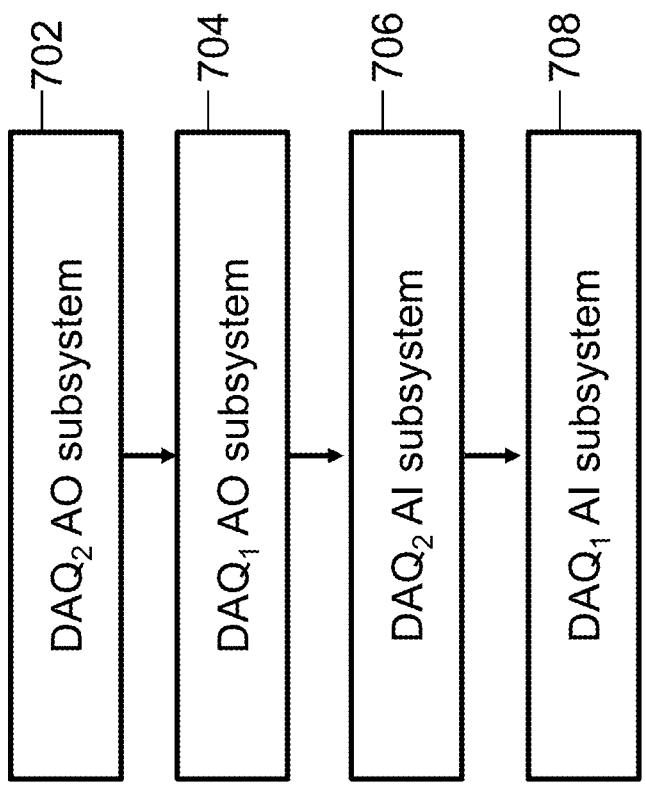
FIG. 7 illustrates an exemplary order in which the subsystems of FIG. 3 can be initiated in some embodiments.

FIG. 7 illustrates an exemplary order in which the subsystems of FIG. 3 can be initiated in some embodiments. In this example, the subsystems of the same type are initiated together. Furthermore, amongst the subsystems of the same type, the subsystems are initiated in the reverse of the order in which the subsystems were configured. Therefore:

In step 702, the AO subsystem 212 of the second DAQ module 208 is initiated.

In step 704, the AO subsystem 206 of the first DAQ module 202 is initiated.

In step 706, the AI subsystem 210 of the second DAQ module 208 is initiated.

In step 708, the AI subsystem 204 of the first DAQ module 202 is initiated.

Figure 8:
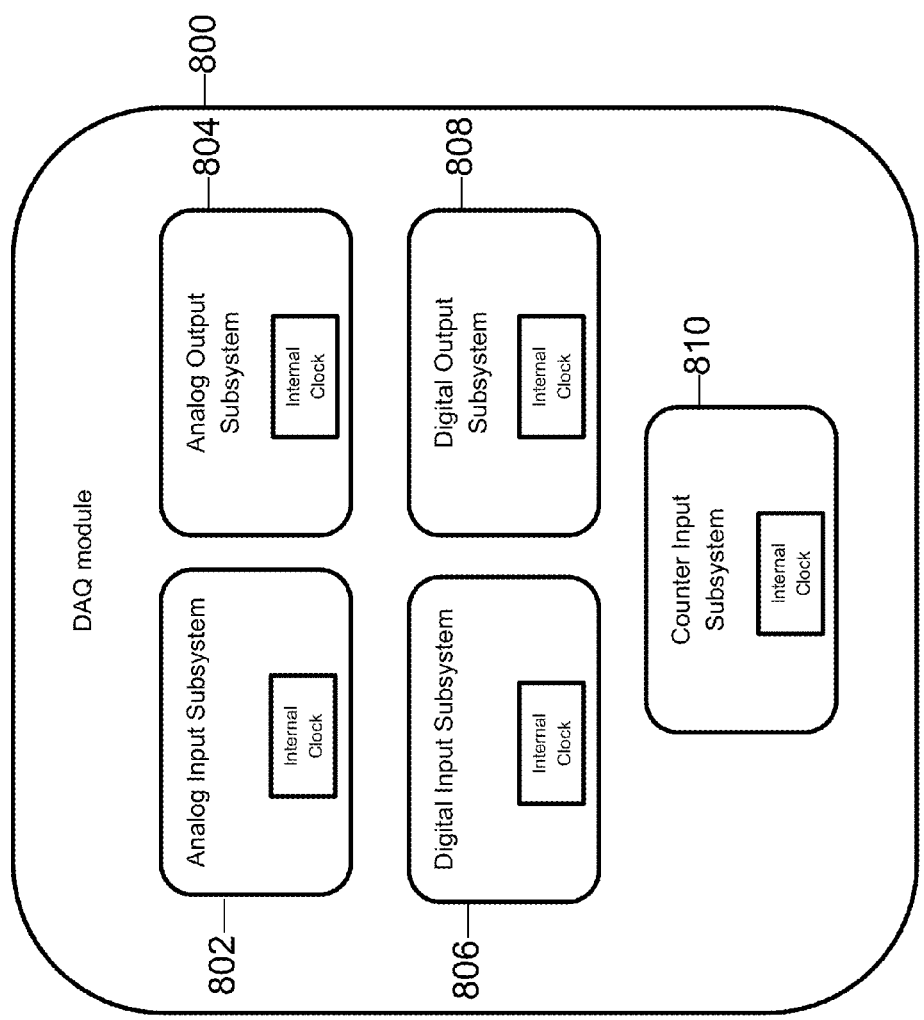
FIG. 8 illustrates a DAQ module with a plurality of subsystems in accordance with some embodiments.

FIG. 8, in particular, illustrates a DAQ module with a plurality of subsystems. The DAQ module 800 can include a plurality of subsystems. The DAQ module 800 includes an analog input (AI) subsystem 802, an analog output (AO) subsystem 804, a digital input (DI) subsystem 806, a digital output (DO) subsystem 808, and a counter input (CI) subsystem 810. In some cases, each of the subsystems can include an internal clock. Therefore, there may be a need to synchronize the operation of these subsystems within the DAQ module 800.

The synchronization can involve the configuration of the clock signal and the trigger signal in subsystems. In some embodiments, one of the subsystems in the DAQ module 800 can be identified as a master subsystem, and the master subsystem can be configured to provide (or export) its clock signal and/or the trigger signal for use by other subsystems.

Figure 9:
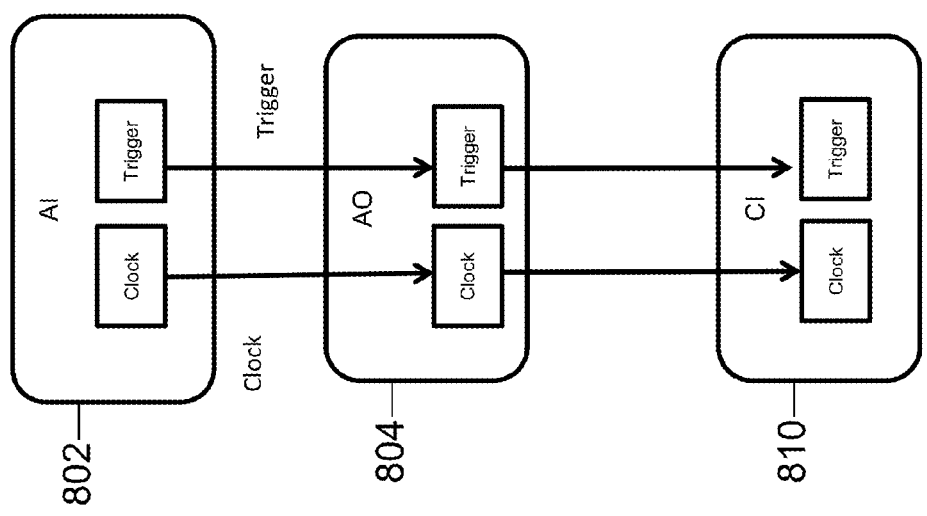
FIG. 9 illustrates a technique for configuring a clock signal and a trigger signal from a master subsystem in accordance with some embodiments.

FIG. 9 illustrates a technique for configuring a clock signal and a trigger signal from a master subsystem in accordance with some embodiments. In this embodiment, the AI subsystem 802 is designated as a master subsystem, and is configured to provide its clock signal and its trigger signal to the remaining subsystems (e.g., slave subsystems). The order in which the subsystems are configured (e.g., the order in which the clock signal and the trigger signal are received by the subsystems) can be illustrated using a linear chain configuration. The order of nodes in the linear chain configuration can indicate an order in which subsystem corresponding to the nodes can be configured. For example, the AI subsystem 802 is at a root node of the linear chain configuration and is configured to provide its clock signal and its trigger signal to an internal node of the linear chain configuration, such as the AO subsystem 804. The internal node of the linear chain configuration can, in turn, provide the clock signal and the trigger signal of the AI subsystem 802 to the leaf node (e.g., a node farthest from the root node) of the linear chain, such as the CI subsystem 810. When there are more than one internal node, the internal nodes can also be connected in a linear chain configuration. For example, the AO module 804 can provide the clock signal and the trigger signal of the AI subsystem 802 to the CI subsystem 810 via the DI subsystem 806 and the DO subsystem 808 (not shown in FIG. 9) that are also arranged in a linear configuration.

Figure 10A:
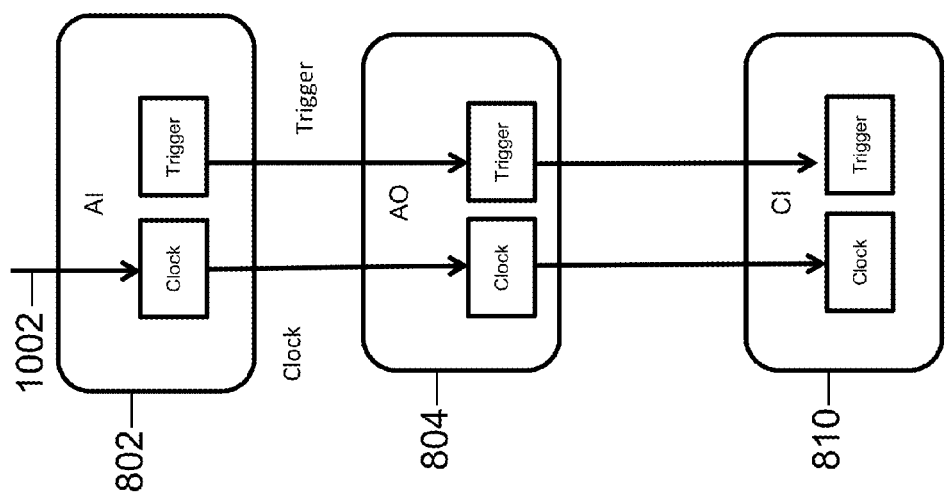
FIG. 10A illustrates a process of synchronizing subsystems of a DAQ module using an external clock signal in accordance with some embodiments.

In some embodiments, the subsystems in the DAQ module 800 can be synchronized using an external reference signal. FIG. 10A illustrates a process of synchronizing subsystems of a DAQ module using an external clock signal in accordance with some embodiments. In this embodiment, as discussed above, the AI subsystem 802 is identified as a master subsystem, and the master subsystem is configured to provide its clock signal and its trigger signal to the other subsystems, as discussed with respect to FIG. 9. The difference between FIG. 9 and FIG. 10A is that the AI subsystem 802 is configured to receive its clock signal from an external source, identified by the arrow 1002. The external source can be, for example, an external controller, a control module 106, or another DAQ module in the same DAQ system. For instance, some DAQ systems include a master synchronization clock that is distributed to all devices in the system so that all devices are synchronized. Such master synchronization clock can be used as the external clock signal. In this embodiment, the AI subsystem 802 is configured to use its own, internal trigger signal and propagate this internal trigger signal to other subsystems in the DAQ module 800.

FIG. 10B illustrates a process of synchronizing subsystems of a DAQ module using an external trigger signal in accordance with some embodiments. In this embodiment, as discussed above, the AI subsystem 802 is identified as a master subsystem, and the master subsystem is configured to provide its clock signal and its trigger signal to the other subsystems, as discussed with respect to FIG. 9. The difference between FIG. 9 and FIG. 10B is that the AI subsystem 802 is configured to receive the trigger signal from an external source, identified by the arrow 1004. The external source can be, for example, an external controller, a control module 106, or another DAQ module in the same DAQ system. For instance, when a user takes a picture using a camera module coupled to the DAQ module, the user's input, such as a button press, can be used as the external trigger signal to cause the camera module to take a picture. In this embodiment, the AI subsystem 802 is configured to use its own, clock signal and propagate this internal clock signal to other subsystems in the DAQ module 800.

Figure 10C:
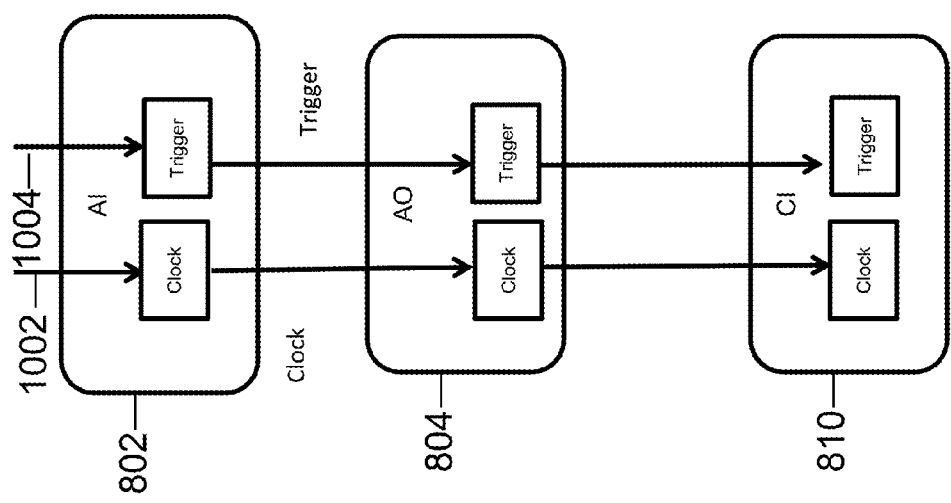
FIG. 10C illustrates a process of synchronizing subsystems of a DAQ module using an external clock signal and an external trigger signal in accordance with some embodiments.

FIG. 10C illustrates a process of synchronizing subsystems of a DAQ module using an external clock signal and an external trigger signal in accordance with some embodiments. In this embodiment, as discussed above, the AI subsystem 802 is identified as a master subsystem, and the master subsystem is configured to provide its clock signal and its trigger signal to the other subsystems, as discussed with respect to FIG. 9. The difference between FIG. 9 and FIG. 10C is that the AI subsystem 802 is configured to receive the clock signal and the trigger signal from one or more external sources, identified by the arrows 1002, 1004. The external source can be an external controller, a control module 106, or another DAQ module, for example, in the same DAQ system.

Figure 10D:
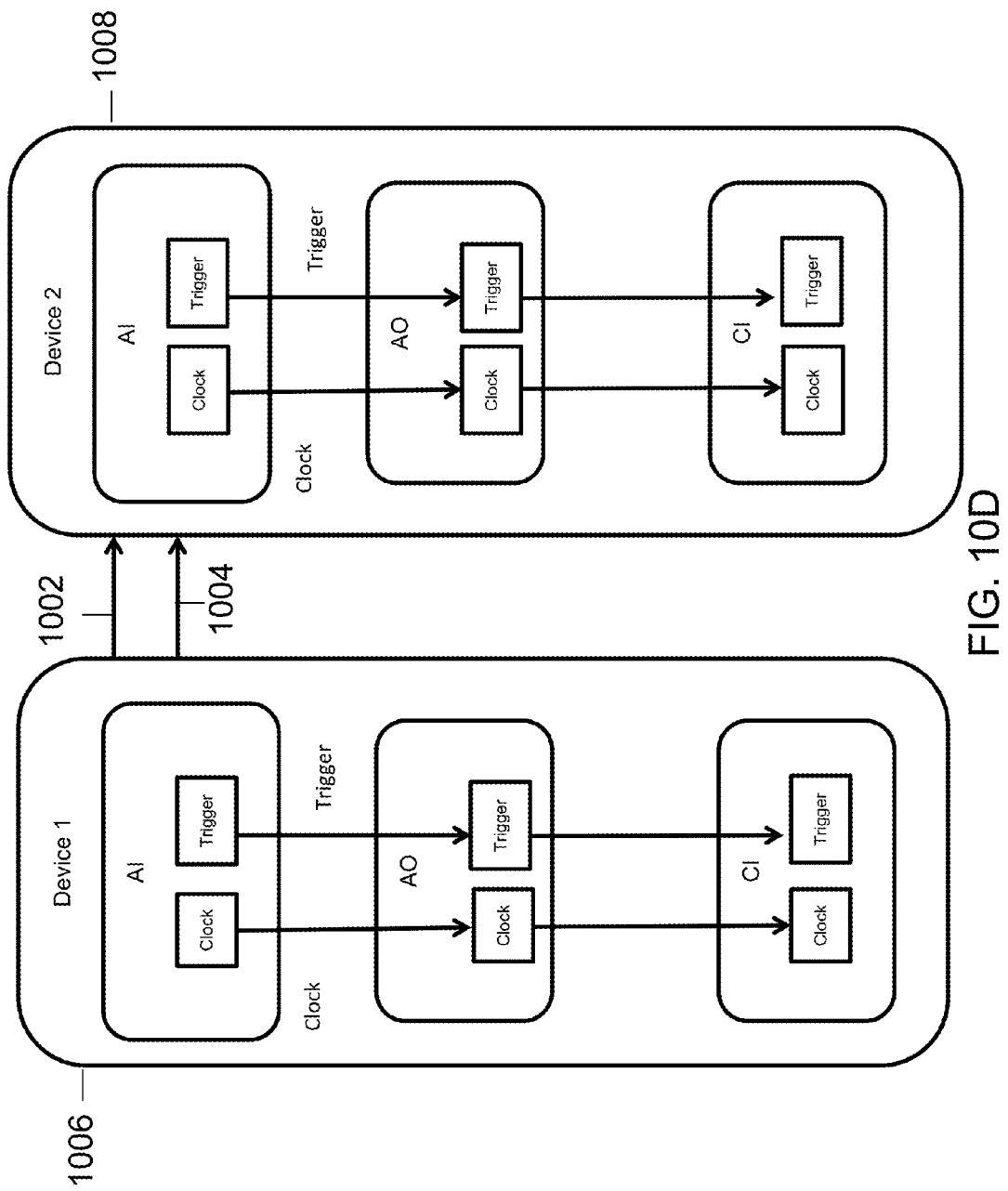
FIG. 10D illustrates a particular case of FIG. 10C in which the external source is another DAQ module in accordance with some embodiments.

FIG. 10D illustrates a particular case of FIG. 10C in which the external source is another DAQ module in accordance with some embodiments. In this embodiment, the first DAQ module 1006 is configured to provide the external clock signal 1002 and the external trigger signal 1004 to the second DAQ module 1008. In some embodiments, when a connection between two or more DAQ modules is missing, as discussed above, the control module 106 can automatically identify such misconnection and provide a warning signal to the user.

Once the subsystems within a DAQ module are coupled in a linear chain configuration, as described above, the subsystems can be initiated in a reverse order of the linear chain configuration. For example, in the embodiment illustrated in FIG. 9, the CI subsystem 810, which is located at a leaf node of the linear chain configuration, can be initiated first. Then the AO subsystem 804, which is located at an internal node of the linear chain configuration, can be initiated next. Then the AI subsystem 802, which is located at a root node of the linear chain configuration, can be initiated the last.

In some embodiments, the synchronization and sampling rate arbitration mechanisms can be augmented with an advisor system. The advisor system can be a computer program executed by the processor 102 that analyzes the configuration of the various DAQ modules in use, and makes recommendations to improve the operation of the system. For example, the advisor can determine whether two modules are synchronized to one another based on the type of connection between the two modules (e.g., USB versus PXI). As a more specific example, the advisor program can recognize that two DAQ devices are connected to the processor 102 via USB, without any direct connection to one another (i.e., a configuration that can make synchronization difficult). In such a configuration, the advisor program can advise the use that synchronization can be improved by directly connecting the two devices together using and sharing, for example, a clock or trigger signal. Thus, the advisor system can provide feedback to the user, and the user can, in response to the feedback, change the configuration of the DAQ system to enable a better synchronization of the DAQ modules and/or subsystems. The advisor system can include a command line based interface or a Graphical User Interface (GUI) based interface to provide the user with specific recommendations regarding connections recommended to enable better synchronization.

The advisor system can be useful when a user would like to add new DAQ modules to the DAQ system. For example, a DAQ module that supports synchronization can include PFI terminals. Therefore, when the advisor system detects that a DAQ module includes PFI terminals, the advisor system can recommend the user to provide connections between DAQ modules' PFI terminals. This way, the advisor system, in effect, recommends that the DAQ modules share the clock signal and the trigger signal. Once the user provides such connections, the control module 106 can automatically complete the synchronization process to achieve synchronization between all DAQ modules in the DAQ system.

The advisor system can also be useful when a user would like to synchronize multiple DAQ systems (e.g., multiple chassis). For example, a DAQ system that supports synchronization can include PFI terminals. Therefore, when the advisor system detects that a DAQ system includes PFI terminals, the advisor system can recommend the user to provide connections between DAQ systems' PFI terminals. This way, the advisor system, in effect, recommends that the DAQ systems share the clock signal and the trigger signal. Once the user provides such connections, the control module 106 can automatically complete the synchronization process to achieve synchronization between all DAQ systems.

In addition to synchronizing the operation of the DAQ modules 108 themselves, the system can also be configured to synchronize signals from the DAQ modules 108 and/or resample signals received from the DAQ modules 108 so that the sampling rate of the received signals are the same. These processes can be useful in a DAQ system in which one or more DAQ modules 108, or one or more subsystems in a DAQ module, are not synchronized in hardware. An example of a scenario where synchronization of the signals and/or resampling can be useful is a prototype car on a test track. A prototype car can include a DAQ system that includes a plurality of DAQ modules configured to receive signals from (1) audio and vibration sensors on the suspension, engine, and other locations, (2) image sensors from the dashboard and other location on the car, and/or (3) the car's own internal communication network. In such a configuration, the various sensor systems (and the associated DAQ modules) may not be aware of each other, in which case, it can be beneficial to synchronize the output of the DAQ modules via a post-process mechanism. Exemplary post-process mechanism are described next.

In some embodiments, the control module 106 can receive signals from the DAQ modules 108, determine temporal offsets between the received signals, and computationally shift the received signals in accordance with the determined temporal offsets so that the received signals are temporally aligned.

In some cases, the temporal offsets between received signals can be determined automatically by the control module 106 based on one or more marker data point in the signals. That is, a physical stimulus can be used that will be sensed by all sensors connected to the system. By shifting the respective sensor data streams so that the physical stimulus occurs at the same time in each data stream, the system can synchronize the sensors and DAQ modules.

Figure 11:
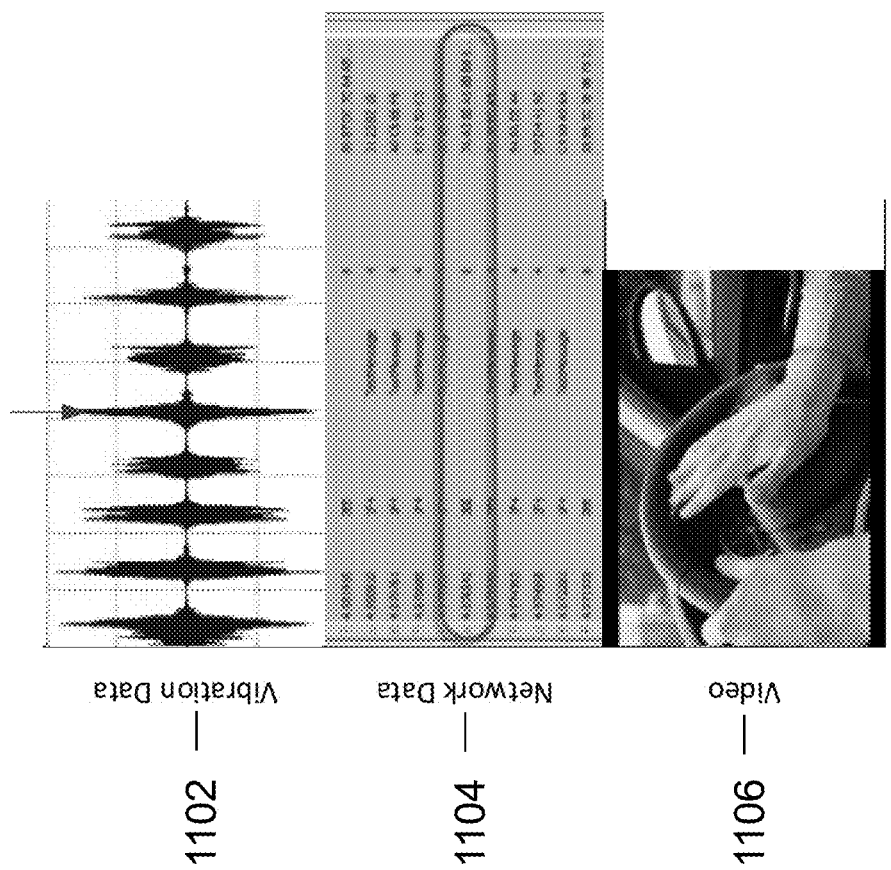
FIG. 11 illustrates a marker data point for a prototype car in accordance with some embodiments.

For example, referring to FIG. 11, a car can be equipped with a vibration sensor that produces vibration data 1102, a network data sensor that produces network data 1104, and a video sensor (e.g., a video camera) that produces video 1106. If a user beeps the horn, all three of the sensors will respond (e.g., the vibration data 1102 will indicate a vibration corresponding to the frequency of the horn, the network data 1104 will indicate that the horn was pressed, and the video 1106 will show the driver pressing the horn). The control module 106 can then shift the respective vibration data 1106, network data 104, and/or video 1106 so that they are all temporally synchronized.

In other cases, the temporal offsets between received signals can be determined manually by a user. In particular, the user can provide an identification of a time instance, to the control module 106, at which a marker data point is present. For example, a frame in the video may be identified, by a user, as a marker data point at which a horn is pressed by the driver.

Oftentimes, the signals captured by DAQ modules are processed us an array-based computing application, such as MATLAB. Therefore, the control module 106 can be configured to post-process the signals from DAQ modules 108 to facilitate the analysis of received signals in an array-based computing application. The control module 106 can be configured to post-process the signals based on the synchronization mechanism used to synchronize the DAQ modules 108. In particular, the control module 106 can be configured to discard one or more data points from signals received from the DAQ modules 108 based on the order in which subsystems of the DAQ modules 108 are configured or initiated.

Figure 12:
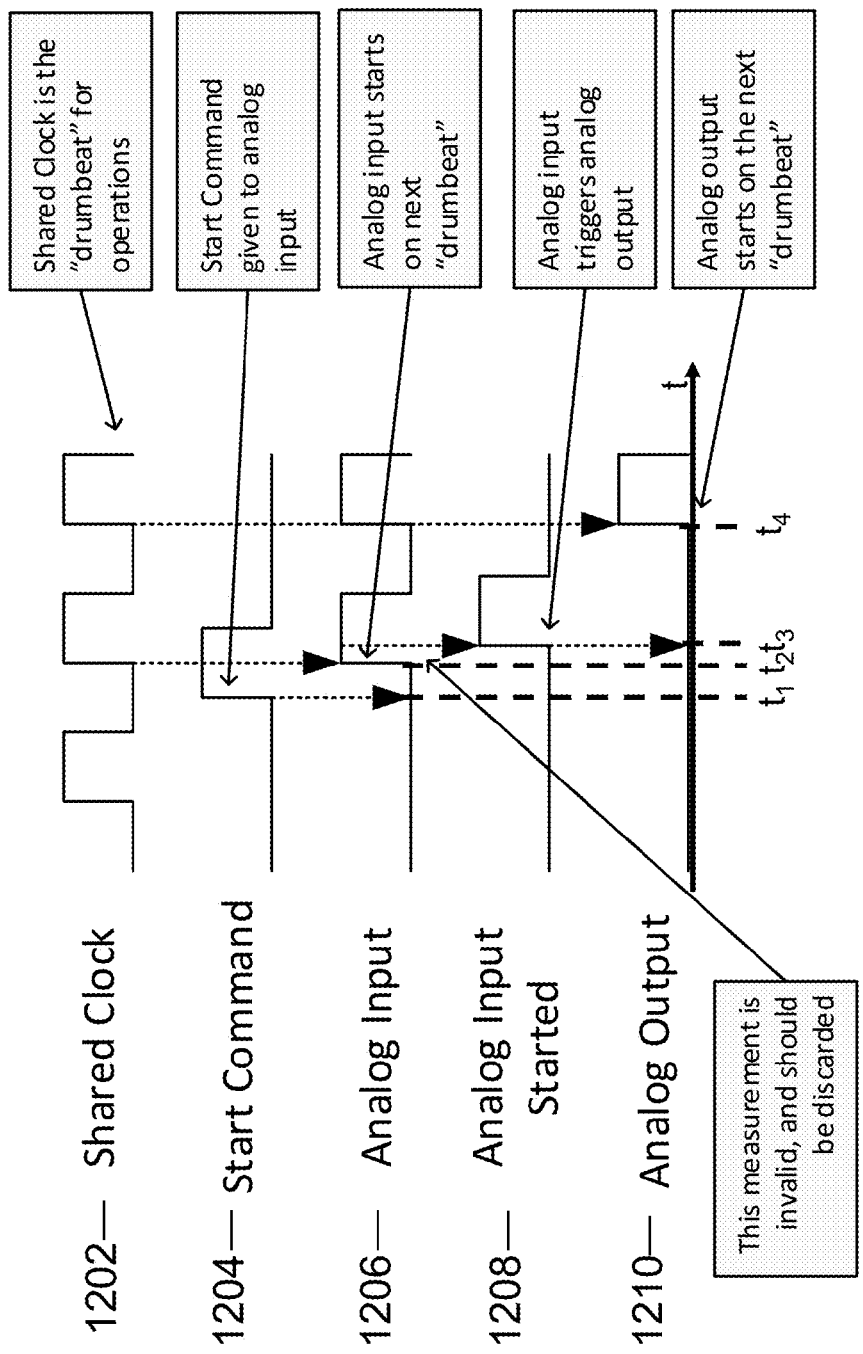
FIG. 12 illustrates a technique for discarding one or more data points from a signal received from subsystems of a DAQ module in accordance with some embodiments.

FIG. 12 illustrates a technique for discarding one or more data points from a signal received from subsystems of a DAQ module in accordance with some embodiments. FIG. 12 shows a time-domain signal diagram for the clock signal 1202, a start command signal (e.g., a trigger signal) 1204, an analog input signal 1206, an analog input started signal 1208, indicating a time instance at which an analog input subsystem has started, and an analog output signal 1210. The clock signal 1202 can be shared by all subsystems. Therefore, the clock signal 1202 can provide a "drumbeat" for operations of subsystems in the DAQ module 108. For example, the subsystems can perform operations or change internal states at a rising edge of the clock signal 1202.

When a DAQ module is subject to a stimulus/response test (e.g., the car horn example above), a stimulus signal can be applied to the DAQ module and the response of the DAQ module can be recorded. When configuring the DAQ module for the stimulus/response test, the control module 106 can configure the analog output subsystem of the DAQ module to initiate in response to the initiation of the analog input subsystem of the DAQ module. Because of such ordering, the first data sample received by the analog input subsystem is typically noise because there was no stimulus signal applied when the output was initiated. Accordingly, this first data point is automatically typically discarded by the control module 106.

For example, at time $t_1$, the analog input subsystem of the DAQ module receives a start command, and, in response, on the next rising edge of the clock signal 1202 (e.g., time $t_2$,) the analog input subsystem can be initiated. Due to the inherent delay of the analog input subsystem, there is a slight delay between the rising edge of the clock signal 1202 at time $t_2$ and a time instance at which the analog input subsystem is started, as indicated by signal 1208. Thus, data points received by the analog output subsystem, from the analog input subsystem at time $t_2$, for example, the horn signals at time $t_2$, are invalid, and accordingly, can be discarded by the control module 106. In contrast, data points received by the analog output subsystem, from the analog input subsystem at time $t_4$, for example, the horn signals at time $t_4$, are valid. Therefore, those data points at time $t_4$ should not be discarded. Symmetrically, the control module 106 can discard the last data point of the analog output subsystem since the analog input subsystem does not acquire a valid data point at that time instance. By discarding all invalid data points from data streams, the control module 106 can facilitate the analysis of data streams from multiple DAQ modules.

In some embodiments, two or more DAQ modules in a DAQ system can operate at different sampling rates. In order to facilitate the analysis of signals from the two or more DAQ modules, it can be desirable to match the sampling rate of the two or more DAQ modules (or subsystems therein) in the DAQ system. This can be accomplished by the control module 106 using sampling rate arbitration between two or more DAQ modules 108 in a DAQ system.

Sampling rate arbitration can be accomplished by comparing a set of sampling rates supported by each of the DAQ modules 108 and/or their subsystems. For example, the control module 106 can be configured to determine a set of sampling rates supported by each of the DAQ modules 108 and/or their subsystems. Subsequently, the control module 106 can identify, based on the determined set for each of the two or more DAQ modules 108 and/or subsystems, one or more sampling rates that are commonly available to the two or more DAQ modules 108 and/or subsystems. Then, the control module 106 can select, from the one or more sampling rates that are commonly available to each of the two or more DAQ modules 108 and/or subsystems, a sampling rate that is closest to the target sampling rate. For example, consider a DAQ system having two DAQ modules, where a first DAQ module supports four sampling rates: 80 MHz, 100 MHz, 150 MHz, and 180 MHz; and the second DAQ module supports four sampling rates: 90 MHz, 110 MHz, 150 MHz, and 180 MHz. The control module 106 can determine that the DAQ modules can both support 150 MHz and 180 MHz. When the control module 106 receives information that the target sampling rate of the DAQ system is 85 MHz, the control module 106 can choose 150 MHz as the common sampling rate for the DAQ system since 150 MHz is closer to 85 MHz than 180 MHz.

Alternatively, the control module 106 can be configured to arbitrate the sampling rate of DAQ modules 108 and/or their subsystems by progressively considering an available sampling rate of one of the DAQ modules 108 and/or their subsystems and determining whether that sampling rate is supported by the remaining DAQ modules 108 and/or their subsystems. If that sampling rate is supported by the remaining DAQ modules 108 and/or their subsystems, then the control module 106 can set that sampling rate as the sampling rate for all DAQ modules 108 and/or their subsystems. If that sampling rate is not supported by any one of the remaining DAQ modules 108 and/or their subsystems, referred to as a target entity, then the control module 106 can identify a sampling rate supported by the target entity and determine if this new sampling rate is supported by the remaining DAQ modules 108 and/or their subsystems. This process can be repeated until one of the following conditions occur: (1) identify a sampling rate that can be supported by all DAQ modules 108 and/or their subsystems, or (2) reach an exit condition, such as reaching a predetermined number of attempts to identify the sampling rate.

For example, consider a DAQ system having two DAQ modules, where a first DAQ module supports four sampling rates: 80 MHz, 100 MHz, 150 MHz, and 180 MHz; and the second DAQ module supports four sampling rates: 90 MHz, 110 MHz, 150 MHz, and 180 MHz. When the control module 106 receives information that the target sampling rate of the DAQ system is 85 MHz, the control module 106 can use the target sampling rate as the minimum sampling rate for the DAQ system. Therefore, the minimum sampling rate for the DAQ system is 85 MHz.

In the next step, the control module 106 determines that the first DAQ module does not support 85 MHz, and that the next higher sampling rate supported by the first DAQ module is 100 MHz. In the next step, the control module 106 determines whether the second DAQ module supports 100 MHz. Since the second DAQ module does not support 100 MHz, the control module 106 determines the next higher sampling rate supported by the second DAQ module, which is 110 MHz. Subsequently, the control module 106 determines that the first DAQ module does not support 110 MHz, and that the next higher sampling rate supported by the first DAQ module is 150 MHz. In the next step, the control module 106 determines that the second DAQ module also supports 150 MHz. Therefore, the sampling rate for the DAQ system is determined to be 150 MHz.

The progressive determination of the sampling rate can be useful on several grounds. For example, the control module 106 is not required to keep track of all sampling rates supported by DAQ modules and/or subsystems. Instead, the control module 106 can receive and consider, one at a time, the sampling rate supported by the DAQ modules and/or subsystems. Therefore, the memory requirement on the control module 106 can be relaxed.

In addition, the progressive determination of the sampling rate can be useful when not all subsystems support discrete sampling rates. Furthermore, most DAQ modules and/or subsystems are already configured to choose a sampling rate closest to the target rate. Therefore, the possible overhead associated with progressive determination of the sampling rate can be low.

Figure 13:
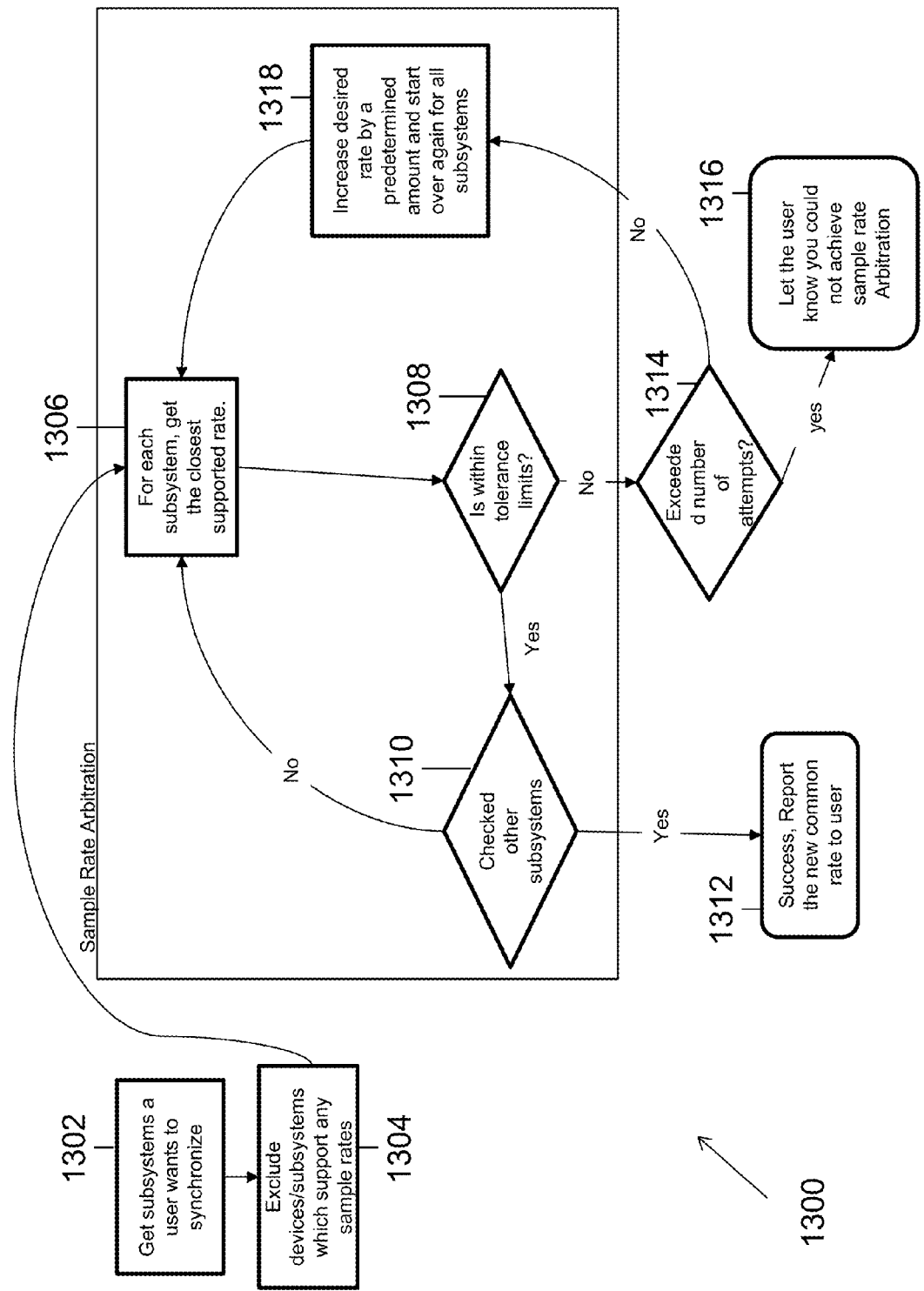
FIG. 13 illustrates the sampling rate arbitration process in accordance with some embodiments.

FIG. 13 illustrates a sampling rate arbitration process 1300 in accordance with some embodiments. The process 1300, however, is exemplary. The process 1300 may be altered, e.g., by having stages added, removed, or rearranged.

In step 1302, the control module 106 can receive information on DAQ modules for which sampling rate arbitration will be performed. Also, the control module 106 can receive a target sampling rate for the DAQ system.

In step 1304, the control module 106 can identify subsystems or DAQ modules that support any sampling rates. For example, the control module 106 can identify subsystems or DAQ modules that can support a continuous range of sampling rates. The control module 106 can discard these subsystems and/or DAQ modules from the sampling rate arbitration process because those subsystems and/or DAQ modules can be adapted to use any sampling rate, regardless of the sampling rate determined by the sampling rate arbitration of the remaining subsystems and/or DAQ modules.

In step 1306, the control module 106 can cause each of the DAQ modules and/or subsystems in the DAQ system to determine the supporting sampling rate that is closest to the target sampling rate, i.e., the closest sampling rate.

In step 1308, the control module 106 can select a first entity from the DAQ modules and/or subsystems in the DAQ system. Subsequently, the control module 106 can identify the closest sampling rate for the first entity. Then, the control module 106 can determine whether a difference between the closest sampling rate of the first entity and the target sampling rate is less than a predetermined threshold. If the difference is less than the predetermined threshold, the process 1300 can proceed to step 1310. If the difference is greater than the predetermined threshold, the process 1300 can proceed to step 1314.

In step 1310, the control module 106 can determine whether the sampling rates of the remaining DAQ modules and/or subsystems are also within a tolerance limit (e.g., the predetermined threshold) of the target sampling rate. If the determined sampling rates of the remaining DAQ modules and/or subsystems are all within the tolerance limit, then process 1300 can proceed to step 1312. If the determined sampling rate of one of the remaining DAQ modules and/or subsystems is not within the tolerance limit, then the control module 106 can set the target sampling rate as the determined sampling rate of the one of the remaining DAQ modules, and the process 1300 can proceed back to step 1306. In some cases, when there are multiple DAQ modules and/or subsystems whose sampling rates are not within the tolerance limit, the control module 106 can be configured to select the smallest of those sampling rates as the target sampling rate.

In step 1312, the control module 106 reports a successful sampling rate match to the user, along with the common sampling rate determined by the control module 106.

In step 1314, the control module 106 can determine whether a number of attempts to arbitrate the sampling rate is greater than a predetermined threshold. If so, the process 1300 can proceed to step 1316, and let the user know that the control module 106 cannot achieve the automatic sampling rate arbitration. Otherwise, the process 1300 can proceed to step 1318, and increase the target sampling rate by a predetermined amount (e.g., increase the minimum sampling rate by the predetermined amount), and proceed back to step 1306 to determine whether the sampling rate arbitration can be performed using the new target sampling rate.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers).

A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the flowchart acts of the subject matter described herein, can be performed by one or more programmable processors executing one or more computer programs to perform functions of the subject matter described herein by operating on input data and generating output.

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), a cloud computing system having a plurality of back-end component, such as data servers, a distributed computing system having a plurality of servers, or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

To the extent that "based on" is used herein, this term is to be construed as open-ended. That is, "based on" should be construed as including "based at least in part on" and "based wholly on."

What is claimed is:

1. An apparatus comprising:
   at least one processor configured to execute code to cause the at least one processor to:
      select a first subsystem from a plurality of subsystems in a data acquisition (DAQ) computing unit as a master subsystem;
      cause a clock signal and a trigger signal from the master subsystem to be provided to at least one additional subsystem in the plurality of subsystems in an order represented by a first linear chain; and
      initialize the master subsystem and the at least one additional subsystem in an order represented by a second linear chain, the initializing occurring after the clock signal and the trigger signal are provided to the at least one additional subsystem, and the second linear chain being a reverse of the first linear chain.

2. The apparatus of claim 1, wherein the at least one subsystem includes an analog input subsystem.

3. The apparatus of claim 1, wherein the clock signal of the master subsystem includes a clock signal received from an external source.

4. The apparatus of claim 1, wherein the code is further configured to cause the processor to select the subsystem as the master subsystem based on an ability of the subsystem to provide a subsystem clock signal and a subsystem trigger signal to other subsystems in the DAQ computing unit.

5. The apparatus of claim 1, wherein the code is further configured to cause the processor to cause the clock signal and the trigger signal from the master subsystem to be provided to at least one additional subsystem of the plurality of subsystems based on a synchronization mechanism, the synchronization mechanism determined based on a type of the DAQ computing unit.

6. The apparatus of claim 1, wherein the code is further configured to cause the processor to:
   receive configuration information for the master subsystem, wherein the configuration information is indicative of a connection from which the master subsystem can receive the clock signal; and
   configure the master subsystem to receive the clock signal from the connection indicated by the configuration information.

7. The apparatus of claim 1, wherein the code is further configured to cause the processor to initiate all subsystems of the same type before initiating a subsystem of a different type.

8. The apparatus of claim 1, wherein the code is further configured to cause the processor to:
   receive a plurality of signals from a plurality of DAQ computing units;
   identify a marker data point from each of the plurality of signals, wherein the marker data point corresponds to a predetermined event that is sensed by each of the plurality of DAQ computing units; and align the marker data point in each of the plurality of signals to temporally align the plurality of signals from the plurality of DAQ computing units.

9. The apparatus of claim 1, wherein the code is further configured to cause the processor to discard a data point from a signal received from the DAQ computing unit based on a synchronization technique used to synchronize subsystems of the DAQ computing unit.

10. The apparatus of claim 9, wherein the code is further configured to cause the processor to discard an output data point of an analog output subsystem when the output data point is provided prior to initiating an analog input subsystem.

11. The apparatus of claim 1, wherein the code is further configured to cause the processor to:
receive information on desired connections of a plurality of DAQ computing unit;
determine that actual connections of the plurality of DAQ computing unit do not match the desired connections; and
provide a warning signal indicating that the actual connections of the plurality of DAQ computing unit do not match the desired connections.

12. A computerized method comprising:
selecting, by a processor, which is in communication with a data acquisition (DAQ) computing unit, a subsystem of the DAQ computing unit as a master subsystem based on an ability of the subsystem to provide a subsystem clock signal and a subsystem trigger signal to other subsystems in the DAQ computing unit;
causing, by the processor, a clock signal and a trigger signal from the master subsystem to be provided to at least one additional subsystem in the DAQ computing unit in an order represented by a first linear chain; and
after the clock signal and the trigger signal are provided to the at least one additional subsystem, initializing the master subsystem and the at least one additional subsystem in an order represented by a second linear chain that is in a reverse configuration of the first linear chain used to provide the clock signal and the trigger signal to the at least one additional subsystem in the DAQ computing unit.

13. The computerized method of claim 12, further comprising:
receiving configuration information for the master subsystem of the DAQ computing unit, wherein the configuration information is indicative of a connection from which the master subsystem can receive the clock signal; and
configuring the master subsystem to receive the clock signal from the connection indicated by the configuration information.

14. The computerized method of claim 12, further comprising:
receiving, at the processor, a plurality of signals from a plurality of DAQ computing units;
identifying, by the processor, a marker data point from each of the plurality of signals, wherein the marker data point corresponds to a predetermined event that is sensed by each of the plurality of DAQ computing units; and
aligning, by the processor, the marker data point in each of the plurality of signals to temporally align the plurality of signals from the plurality of DAQ computing units.

15. The computerized method of claim 12, further comprising discarding a data point from a signal received from the DAQ computing unit based on a synchronization technique used to synchronize the subsystems of the DAQ computing unit.

16. The computerized method of claim 15, further comprising:
receiving information of desired connections of a plurality of DAQ computing units;
determining that actual connections of the plurality of DAQ computing units do not match the desired connections; and
providing a warning signal indicating that the actual connections of the plurality of DAQ computing units do not match the desired connections.

17. A non-transitory computer readable medium having executable instructions that are configured to, when executed by at least one processor, cause at least one processor to:
communicate with a data acquisition (DAQ) computing unit;
select a subsystem in the DAQ computing unit as a master subsystem;
cause a clock signal and a trigger signal from the master subsystem to be provided to at least one additional subsystem in the DAQ computing unit in an order represented by a first linear chain in accordance with a synchronization mechanism determined based on a type of the DAQ computing unit; and
after the clock signal and the trigger signal are provided to all of the at least one additional subsystem, initialize the master subsystem and the at least one additional subsystem in an order represented by a second linear chain that is in a reverse configuration of the first linear chain used to provide the clock signal and the trigger signal to the at least one additional subsystem in the DAQ computing unit.

18. The non-transitory computer readable medium of claim 17, wherein the executable instructions are further operable to cause the at least one processor to:
receive information of desired connections of a plurality of DAQ computing units;
determine that actual connections of the plurality of DAQ computing units do not match the desired connections; and
provide a warning signal indicating that the actual connections of the plurality of DAQ computing units do not match the desired connections.

19. The non-transitory computer readable medium of claim 17, wherein the executable instructions are further operable to cause the at least one processor to:
receive a plurality of signals from a plurality of DAQ computing units;
identify a marker data point from each of the plurality of signals, wherein the marker data point corresponds to a predetermined event that is sensed by each of the plurality of DAQ computing units; and
align the marker data point in each of the plurality of signals to temporally align the plurality of signals from the plurality of DAQ computing units.

20. The non-transitory computer readable medium of claim 17, wherein the executable instructions are further operable to cause the at least one processor to:
receive configuration information for the master subsystem of the DAQ computing unit, wherein the configuration information is indicative of a connection from which the master subsystem can receive the clock signal; and configure the master subsystem to receive the clock signal from the connection indicated by the configuration information.

21. The non-transitory computer readable medium of claim 17, wherein the instructions are further configured to cause the processor to communicate with a DAQ computing unit in a prototype vehicle to receive information about the prototype vehicle.

* * * * *